United States Patent
Chen et al.

(10) Patent No.: US 12,537,264 B2
(45) Date of Patent: Jan. 27, 2026

(54) BATTERY MODULE ENCLOSURE WITH STIFFENING STRUCTURE

(71) Applicant: Canoo Technologies Inc., Torrance, CA (US)

(72) Inventors: Yuhang Chen, Torrance, CA (US); Oscar Francisco Cervantes Huacuja, Torrance, CA (US)

(73) Assignee: CANOO TECHNOLOGIES INC., Torrance, CA (US)

( * ) Notice: Subject to any disclaimer, the term of this patent is extended or adjusted under 35 U.S.C. 154(b) by 586 days.

(21) Appl. No.: 18/051,595

(22) Filed: Nov. 1, 2022

(65) Prior Publication Data

US 2024/0145859 A1 May 2, 2024

(51) Int. Cl.
*H01M 50/383* (2021.01)
*B60L 50/60* (2019.01)
(Continued)

(52) U.S. Cl.
CPC .......... *H01M 50/383* (2021.01); *B60L 50/64* (2019.02); *B60L 50/66* (2019.02); *B60L 58/24* (2019.02);
(Continued)

(58) Field of Classification Search
CPC ............ H01M 50/383; H01M 50/209; H01M 50/213; H01M 50/289; H01M 50/367;
(Continued)

(56) References Cited

U.S. PATENT DOCUMENTS

| | | | |
|---|---|---|---|
| 10,763,477 B2 | 9/2020 | Hermann | |
| 11,251,494 B2 | 2/2022 | Weicker et al. | |
| 11,316,230 B1 * | 4/2022 | Boecker | H01M 10/6556 |
| 2022/0285758 A1 * | 9/2022 | Ziegler | H01M 10/625 |

FOREIGN PATENT DOCUMENTS

| | | | | |
|---|---|---|---|---|
| CN | 114006099 A | * | 2/2022 | H01M 10/613 |
| CN | 216085041 U | * | 3/2022 | H01M 10/613 |

OTHER PUBLICATIONS

International Search Report and Written Opinion dated Jan. 23, 2024, in connection with International Application No. PCT/US2023/070105, 8 pages.

(Continued)

*Primary Examiner* — Daniel S Gatewood
(74) *Attorney, Agent, or Firm* — ALLEN, DYER, DOPPELT, GILCHRIST, P.A.

(57) ABSTRACT

A battery system includes a cover including a plurality of guide apertures. The battery system includes a thermal barrier disposed adjacent the plurality of guide apertures of the cover. The battery system includes a stiffening structure disposed between the cover and the thermal barrier. The plurality of guide apertures guides emissions through the cover, and the thermal barrier absorbs heat energy generated by the emissions. The battery system may further include a plurality of battery cells, and the thermal barrier may be disposed between the plurality of battery cells and the cover. Each of the plurality of guide apertures of the cover may be aligned with a vent of one of the plurality of battery cells. The stiffening structure may also include cutouts each shaped to correspond to at least one vent. The stiffening structure may also include indentions to press the thermal barrier against the plurality of battery cells.

24 Claims, 24 Drawing Sheets

(51) Int. Cl.
| | |
|---|---|
| *B60L 50/64* | (2019.01) |
| *B60L 58/24* | (2019.01) |
| *H01M 50/209* | (2021.01) |
| *H01M 50/213* | (2021.01) |
| *H01M 50/289* | (2021.01) |
| *H01M 50/367* | (2021.01) |

(52) U.S. Cl.
CPC ....... *H01M 50/209* (2021.01); *H01M 50/213* (2021.01); *H01M 50/289* (2021.01); *H01M 50/367* (2021.01)

(58) Field of Classification Search
CPC ........... H01M 2220/20; H01M 10/613; H01M 10/625; H01M 10/658; H01M 50/249; B60L 50/64; B60L 50/66; B60L 58/24; B60L 3/0046; B60L 2240/545; B60L 58/26; Y02E 60/10
See application file for complete search history.

(56) References Cited

OTHER PUBLICATIONS

Feng, et al., "Mitigating Thermal Runaway of Lithium-Ion Batteries," Joule 4—Cell Press, Apr. 15, 2020, pp. 743-770, 28 pages.
Shi, et al., "Mitigating thermal runaway of lithium-ion battery through electrolyte displacement," Applied Physics Letters, 110(6), Feb. 6, 2017, vol. 110, Issue 6, 10.1063/1.4975653, American Institute of Physics, 5 pages.

* cited by examiner

BATTERY MODULE ENCLOSURE WITH STIFFENING STRUCTURE

CROSS-REFERENCE TO RELATED APPLICATIONS

This application is related to the subject matter of U.S. patent application Ser. No. 17/814,204, filed Jul. 21, 2022, and entitled MITIGATING THERMAL RUNAWAY OF LITHIUM-ION BATTERIES, the entire contents of which are herein incorporated by reference in their entirety.

TECHNICAL FIELD

This disclosure relates generally to electrical batteries. More specifically, this disclosure relates to a battery module enclosure with a stiffening structure.

BACKGROUND

Lithium (Li)-ion rechargeable battery cells have an intrinsic drawback of catching fire from organic solvents, highly unstable plated Li-metal, or exothermic reactions of cathode active material, which are core components of current Li-ion rechargeable battery cell systems. Due to the intrinsic technical advantage in volumetric and gravimetric energy density, Li-ion rechargeable cells are promising battery systems for electric vehicles and other energy storage systems. Therefore, in current energy storage systems, mitigating, retarding, or stopping fire propagation is critical for Li-ion rechargeable battery systems. To avoid and prevent propagating fire between cells, various approaches have been attempted, such as mechanical protection, liquid immersion, applying fire retarding material, using a built-in extinguisher, etc. However, these approaches require additional costs and volume. Thus, implementing these approaches with a Li-ion battery system is typically not feasible given the constrained volume for automotive vehicles, bikes, airplanes, etc.

SUMMARY

In one example embodiment, a battery system includes a cover including a plurality of guide apertures. The battery system also includes a thermal barrier disposed adjacent the plurality of guide apertures of the cover. The battery system also includes a stiffening structure disposed between the cover and the thermal barrier. Each one of the plurality of guide apertures is configured to guide emissions through the cover, and the thermal barrier is configured to absorb heat energy generated by the emissions.

In some embodiments, the battery system further includes a plurality of battery cells, and the thermal barrier is disposed between the plurality of battery cells and the cover.

In some embodiments, each one of the plurality of battery cells includes a vent configured to release the emissions.

In some embodiments, each of the plurality of guide apertures of the cover is aligned with the vent of one of the plurality of battery cells to guide emissions released by the vent through the cover.

In some embodiments, the battery system further includes a housing, the plurality of battery cells is arranged within the housing, and the cover is coupled to the housing.

In some embodiments, the cover includes side plates each coupled to the housing, the side plates each include a portion of the plurality of guide apertures, and the thermal barrier includes two thermal barriers each disposed adjacent to one of the side plates.

In some embodiments, the plurality of battery cells is a plurality of cylindrical battery cells.

In some embodiments, the plurality of battery cells is a plurality of prismatic battery cells.

In some embodiments, the vent is configured to open in response to pressure reaching a preset threshold level.

In some embodiments, the thermal barrier has a tensile strength below 150 kPa.

In some embodiments, the stiffening structure includes a plurality of cutouts each shaped to correspond to at least one vent of at least one of the plurality of battery cells.

In some embodiments, the stiffening structure includes indentions to press the thermal barrier against the plurality of battery cells.

In another example embodiment, an electric vehicle includes at least one electric motor. The electric vehicle also includes a power supply configured to provide electrical energy to the at least one electric motor. The power supply includes a battery module. The battery module includes a cover including a plurality of guide apertures. The battery module also includes a thermal barrier disposed adjacent the plurality of guide apertures of the cover. The battery module also includes a stiffening structure disposed between the cover and the thermal barrier. Each one of the plurality of guide apertures is configured to guide emissions through the cover, and the thermal barrier is configured to absorb heat energy generated by the emissions.

In some embodiments, the battery module further includes a plurality of battery cells, and the thermal barrier is disposed between the plurality of battery cells and the cover.

In some embodiments, each one of the plurality of battery cells includes a vent configured to release the emissions.

In some embodiments, each of the plurality of guide apertures of the cover is aligned with the vent of one of the plurality of battery cells to guide emissions released by the vent through the cover.

In some embodiments, the battery module further includes a housing, the plurality of battery cells is arranged within the housing, and the cover is coupled to the housing.

In some embodiments, the cover includes side plates each coupled to the housing, the side plates each include a portion of the plurality of guide apertures, and the thermal barrier includes two thermal barriers each disposed adjacent to one of the side plates.

In some embodiments, the plurality of battery cells is a plurality of cylindrical battery cells.

In some embodiments, the plurality of battery cells is a plurality of prismatic battery cells.

In some embodiments, the vent is configured to open in response to pressure reaching a preset threshold level.

In some embodiments, the thermal barrier has a tensile strength below 150 kPa.

In some embodiments, the stiffening structure includes a plurality of cutouts each shaped to correspond to at least one vent of at least one of the plurality of battery cells.

In some embodiments, the stiffening structure includes indentions to press the thermal barrier against the plurality of battery cells.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
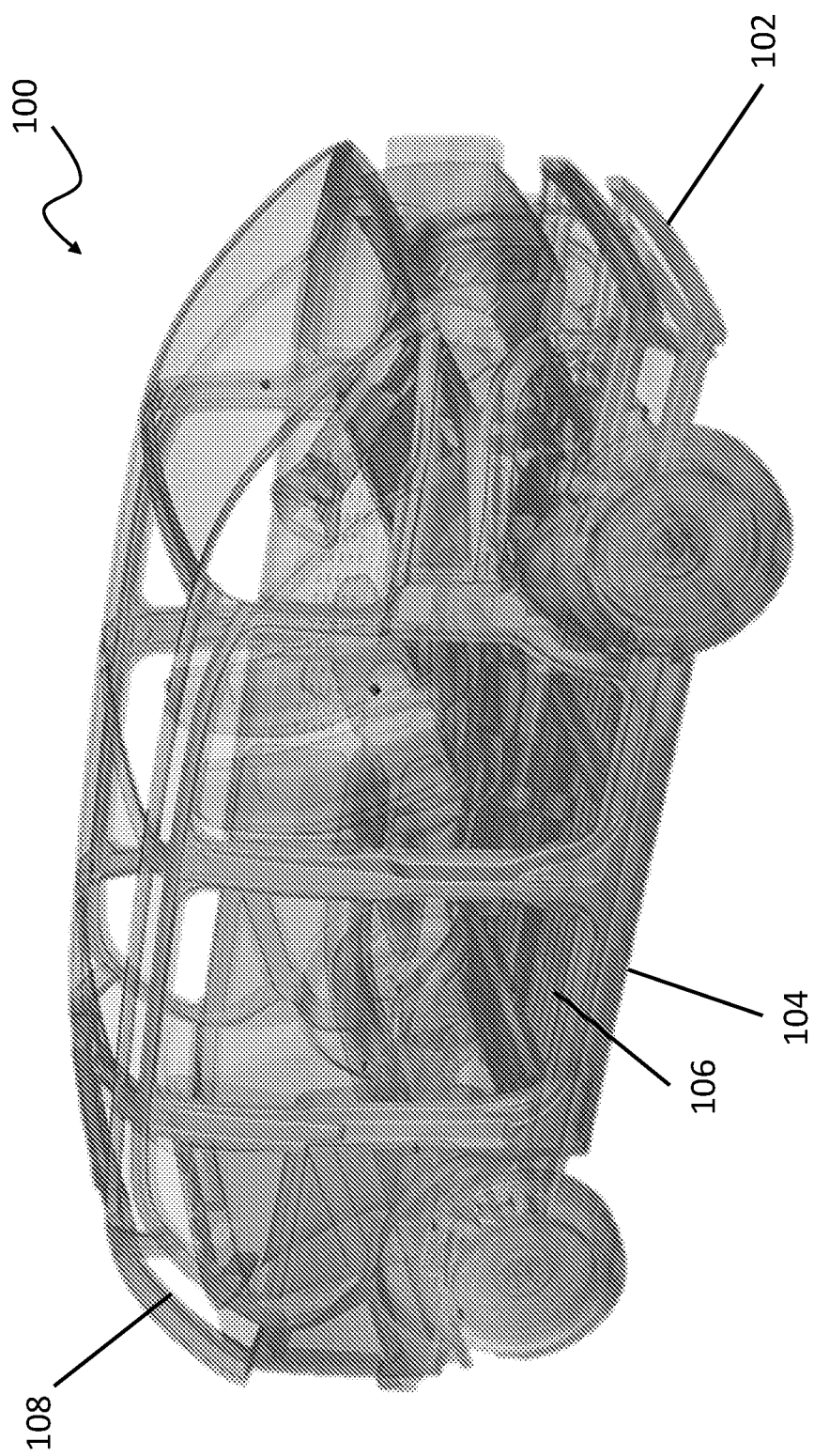
FIG. 1 illustrates an example electric vehicle including a battery module storage location in accordance with embodiments of this disclosure.

FIGS. 1 through 8, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, Lithium (Li)-ion rechargeable battery cells have an intrinsic drawback of catching fire from organic solvents, highly unstable plated Li-metal, or exothermic reactions of cathode active material, which are core components of current Li-ion rechargeable battery cell systems. Due to the intrinsic technical advantage in volumetric and gravimetric energy density, Li-ion rechargeable cells are promising battery systems for electric vehicles and other energy storage systems. Therefore, in current energy storage systems, mitigating, retarding, or stopping fire propagation is critical for Li-ion rechargeable battery systems. To avoid and prevent propagating fire between cells, various approaches have been attempted, such as mechanical protection, liquid immersion, applying fire retarding material, using a built-in extinguisher, etc. However, these approaches require additional costs and volume. Thus, implementing these approaches with a Li-ion battery system is typically not feasible given the constrained volume for automotive vehicles, bikes, airplanes, etc.

For example, existing electric vehicle battery module enclosure designs have multi-layer thermal barriers (phosphate plate, thin plastics, and aluminum lid) laminated without perforated features. Such designs are based on the assumption that high temperature and large impact forces from cell venting will pierce through those multiple layers and eventually form the venting holes for releasing the gas. Existing electric vehicle battery module enclosure designs also often use a low thermal conductivity potting material added to fill the gap inside the battery module with battery cells to avoid heat energy transferring from an initiating cell to the surrounding cells.

Enclosure design such as these have various drawbacks. For example, it is extremely difficult to identify which specific area and location of the battery module has to be protected thermally from thermal runaway fire in terms of explosive burst fire direction. It is also uncertain that there will be always venting holes created when thermal event happens. Additionally, potting materials in the battery module add more weight to the overall assembly, and potting material thickness variance due to volume expansion of the material after curing can affect forming of the venting holes when a thermal event occurs. This can trap the hot combustible gases underneath the potting material which will lead to subsequent explosions.

Various embodiments of this disclosure include a battery system for an electric vehicle or other powered device or system. The battery system includes a plurality of components, such as a plurality of battery cells with a thermal barrier and a protective cover that are coupled such that they form a battery module that makes up at least a portion of a power source. In various embodiments, battery modules are stored in an enclosure that makes up a portion of an electric vehicle framework and provides structural support to both the electric vehicle and the various components of a skateboard structure, as well as support mechanisms for individual battery modules within the structure.

This disclosure provides a battery system or module that includes a thermal insulation barrier disposed around a portion of the battery cells of the battery system, a cover including a plurality of apertures aligned with locations of cell vents of the battery system, and a stiffening structure to provide structural support to the cover. The battery system of this disclosure is extremely effective to prevent and/or mitigate fire propagation from a cell experiencing thermal runaway, and the battery system is compact and conveniently allows for the use of Li-ion rechargeable cells in constrained spaces (such as in electric automotive vehicles) while alleviating and preventing thermal runaway and fire propagation issues.

The battery module design of this disclosure is thus composed of a thermal barrier, stiffening structures, and plastic cover that can be laminated together. The thermal barrier in the assembly has a very thin thickness and is compressible with low thermal conductivity to retard thermal conduction when a thermal event occurs. The stiffening structure is designed with cutouts and stamped features to ensure the overall structural integrity of thermal barrier and plastic cover to maintain thermal insulation when a thermal event occurs and to help guide the hot combustible gases out through the perforated cover. The cutouts and stamped features on the stiffening structure are designed to align with the cells so that for every specific area and location in the battery module, the surrounding cells can be protected when a single cell goes to thermal runaway. The various embodiments of this disclosure are applicable for various battery cell orientations for different design configurations, and are applicable for both prismatic and cylindrical cell configurations.

The development of electric vehicles brings with it new challenges, including the storage and protection of the power source that serves to provide power to the propulsion system of the electric vehicle. Typically, electric vehicle manufactures design a framework for the vehicle to support all of the functional elements of the vehicle. Many such frameworks are designed to support the propulsion system as well as mechanical and electrical linkages between the propulsion system and other components and systems of the vehicle. Included within the framework of many vehicles is a location to store a power supply having one or more battery modules, which is typically used to provide the main power to the various components of the vehicle including the propulsion system. Many vehicle designs incorporate a battery storage area in the bottom of the vehicle due to the weight of the batteries, thus keeping the center of gravity as low as possible. Additionally, monolithic pre-sealed batteries can be inserted into an interior space within the framework of the vehicle. The pre-sealed batteries add a layer of protection around the batteries to prevent leakage or damage. An example vehicle framework is disclosed in U.S. Pat. No. 11,251,494, which is hereby incorporated by reference in its entirety.

FIG. 1 illustrates an example electric vehicle 100 including a battery module storage location in accordance with embodiments of this disclosure. The electric vehicle 100 includes a framework 102 on which various components are positioned. In various embodiments, the electric vehicle 100 includes a power supply (such as one or more battery modules) that provides electrical power to one or more electric motors and other components of the electric vehicle 100. The electric vehicle 100 further includes a battery enclosure 104 that may be positioned in or near the center of the electric vehicle 100, which is designed to house one or more battery components 106. The positioning can help to stabilize the vehicle 100 by ultimately lowering its center of gravity. Many embodiments of an electric vehicle framework 102 can also provide attachment points for an upper portion or top hat 108 of the electric vehicle 100 that may have its own separate frame structure to support the overall body of the vehicle 100.

The electric vehicle 100 can, in various embodiments, include a battery enclosure to provide additional structural elements that act to strengthen the overall framework 102 of the vehicle 100, as well as support other functional components of the vehicle 100. In part, this also allows for a more modular design with respect to the battery compartment. Having multiple sections of the overall battery compartment can allow for the use of numerous individual battery modules to be housed within the compartment. The modularity can be advantageous in that maintenance costs can be reduced by not requiring the entire power supply or monolithic pre-sealed battery to be replaced, but rather individual modules can be replaced and/or repaired as needed. Additionally, maintaining a sealed enclosure or one that is protected from the outside environment can be useful or important to electric vehicle power sources. Accordingly, some embodiments may incorporate top and bottom plates that can ultimately act to seal the entire battery compartment as well as provide additional protection for outside intrusion or exposure.

Although FIG. 1 illustrates one example of an electric vehicle 100, those skilled in the art will recognize that the full structure and operation of a suitable vehicle are not depicted in the drawings or described here. Instead, for simplicity and clarity, only the structure and operation necessary for an understanding this disclosure is depicted and described. Various changes may be made to the example of FIG. 1, and improved battery modules to mitigate thermal runaway described in this disclosure may be used with any other suitable vehicle or any other suitable powered device or system.

Figure 2A:
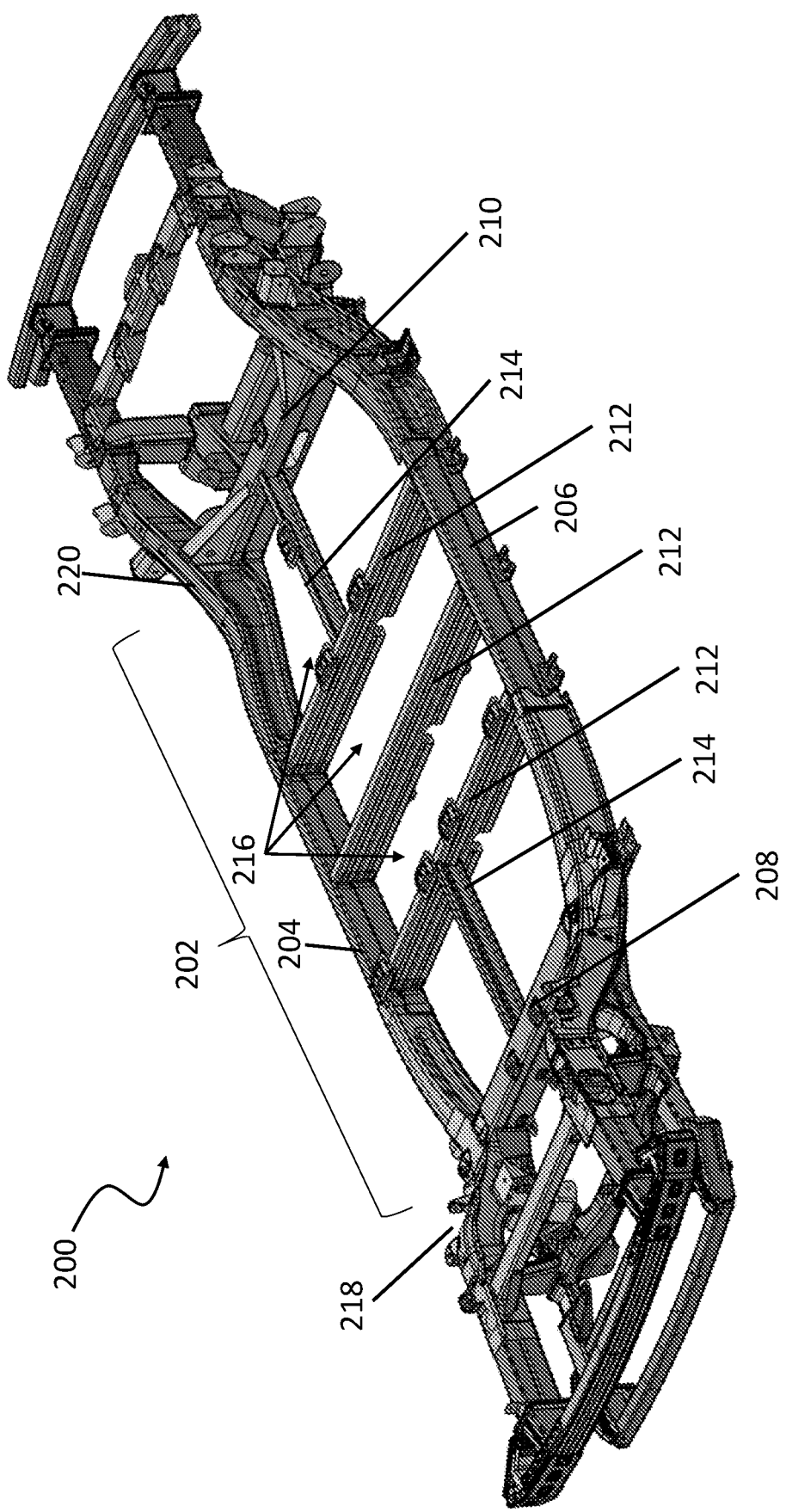
FIGS. 2A-2C illustrate an example vehicle framework and an example battery enclosure in accordance with embodiments of this disclosure.
Figure 2B:
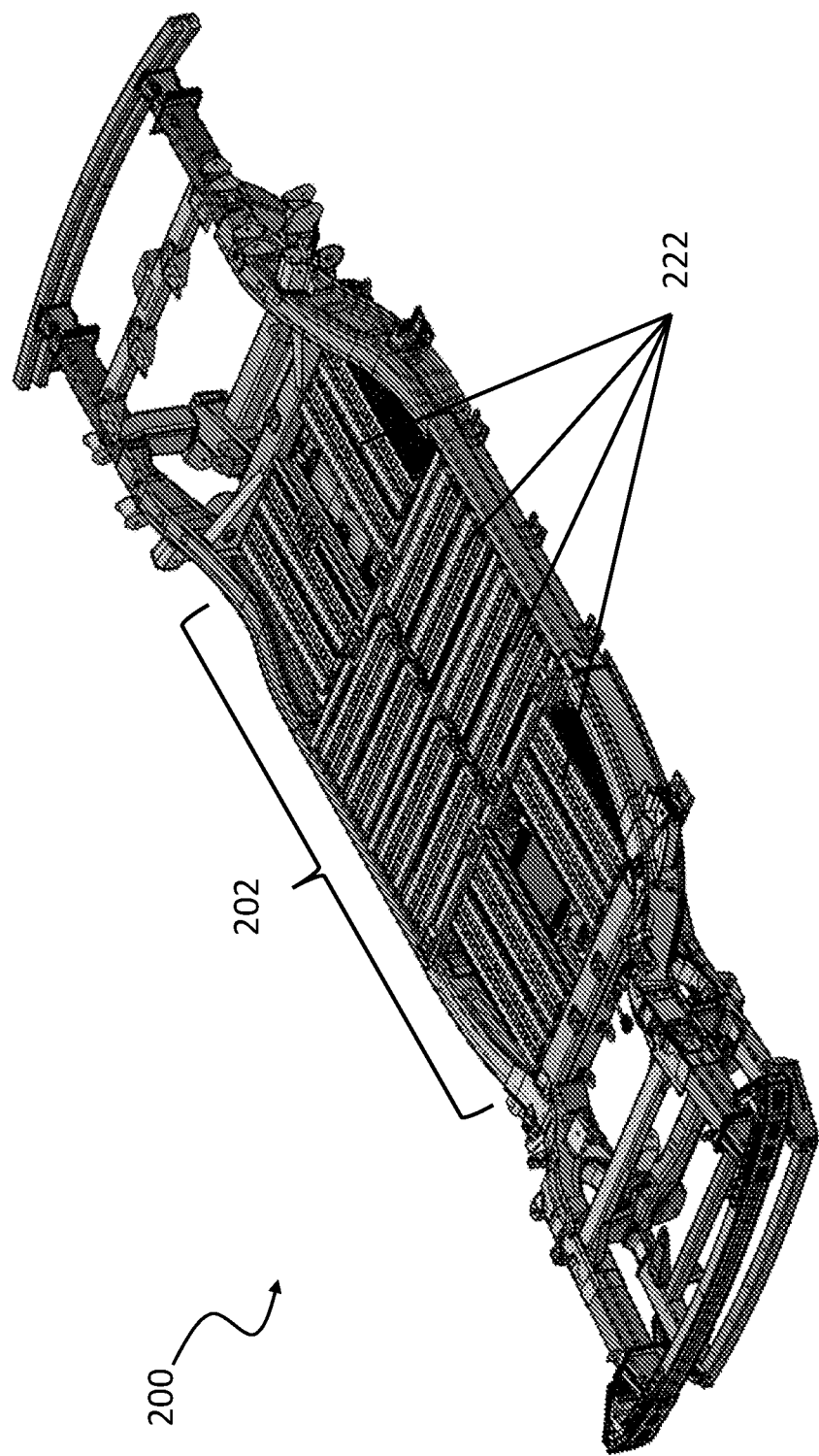
Figure 2C:
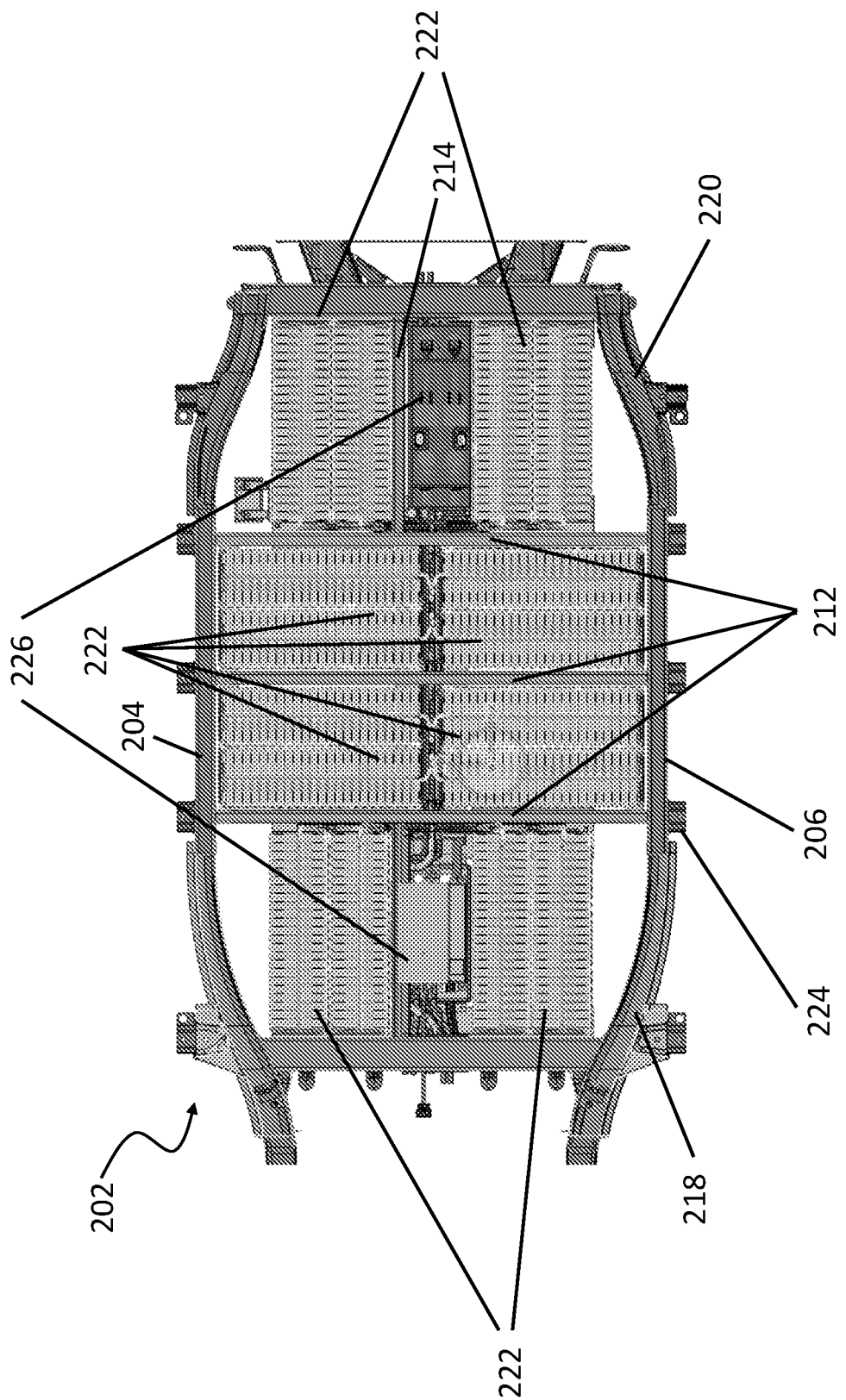

FIGS. 2A-2C illustrate an example vehicle framework 200 and an example battery enclosure 202 in accordance with embodiments of this disclosure. In some embodiments, the vehicle framework 200 can incorporate the battery enclosure 202 within an open mid-section of the vehicle framework 200. For example, FIGS. 2A and 2B illustrate embodiments of the vehicle framework 200 with a forward end and a rear end. A center section represents what may be considered the battery enclosure 202. The vehicle framework 200 can include various components, such as side rails 204 and 206 and forward and rear cross members 208 and 210, to make up the exterior walls or framework of the battery enclosure 202. The framework 200 can also include additional components that subdivide the interior space of the mid-body or battery enclosure 202 into a number of separated interior spaces. For instance, the battery enclosure 202 may contain additional cross members 212 that transverse the width of the framework. Such cross members can act to add additional strength (twisting, bending, and impact) to the framework of the vehicle 100 and provide additional structural support for the battery modules. The cross members 212 may also serve to provide structural support and connection points for additional elements within the body of the vehicle, such as seating elements and/or upper body components.

In various embodiments, the battery enclosure 202 may also have longitudinal support members 214 that may be connected between the forward and rear cross members 208 and 210 and a transverse cross member 212 of the battery enclosure 202. Similar to the transverse cross members 212, the longitudinal support members 214 may serve to add structural support to the framework 200 as well as battery modules 222 as illustrated in FIGS. 2B and 2C.

The structural elements of the battery enclosure 202 may define one or more spaces 216 that can serve as areas to place battery modules. Additionally, the longitudinal and traverse cross members 214 and 212 may be configured with one or more openings that traverse the width of the various cross members. The openings, in many embodiments, may be used to run interconnection components between the various battery modules and/or auxiliary elements. Although certain configurations of structural elements are shown, it should be understood that any number and arrangement of such structural members might be implemented such that sufficient frame stability is created. In addition to conferring additional stability to the vehicle platform, such interior structural members also provide support elements for one or more of the battery modules 222 and/or support components 224 disposed within the frame battery compartment and for vehicle body elements mounted to the vehicle platform.

Since the battery enclosure 202 may serve as a multi-function component of the overall vehicle 100, many embodiments may incorporate unique features and elements within the battery enclosure framework to improve the overall function of the framework and electric vehicle 100. For example, many embodiments of the side rails 204 and 206 may have additional forward and rear frame rails 218 and 220. The frame rails 218 and 220 may serve as additional support elements for the vehicle components. However, in many embodiments, the frame rails 218 and 220 may also serve as extensions of the side rails 204 and 206 that make up the sides of the battery enclosure 202. Additionally, some embodiments may incorporate impact control elements to help prevent potential penetration into the energy storage compartment.

Energy storage systems that have modular battery components may be designed with various structural and functional features to aid in the simplicity of design, use, and overall adaptability of the electric vehicle platform. For example, some embodiments may be adaptable to different power requirements that may involve more or fewer battery modules. Thus, modularity of components can be beneficial in the overall function of the vehicle platform. In some embodiments, such as the one shown in FIG. 2C, the vehicle framework 200 incorporates an electric vehicle battery system or energy storage system that includes a number of separate modular vehicle battery elements 222 interconnected together and with the other elements of the vehicle platform through a suitable configuration of wires and/or buses, as well as battery support systems 226 (such as cooling, battery disconnects, and power management components). These modular vehicle battery elements 222 are disposed within the mid-body space 216 of the framework 200 such that the structural elements of the framework 200 combine to directly form the sealed battery containment vessel for the vehicle battery elements. By using elements of the framework 200 as the containment vessel for the energy storage system, substantial weight savings can be realized in accordance with some embodiments.

Although FIGS. 2A-2C illustrate one example of a vehicle framework 200 and one example of a battery enclosure 202, those skilled in the art will recognize that the full structure and operation of a suitable vehicle framework and battery enclosure are not depicted in the drawings or described here. Instead, for simplicity and clarity, only the structure and operation necessary for an understanding this disclosure is depicted and described. Various changes may be made to the examples of FIGS. 2A-2C, such as positioning the battery enclosures at other locations of the framework 200 or of the electric vehicle 100. Also, the improved battery modules designed to mitigate thermal runaway described in this disclosure may be used with any other suitable vehicle framework or other structure.

Figure 3A:
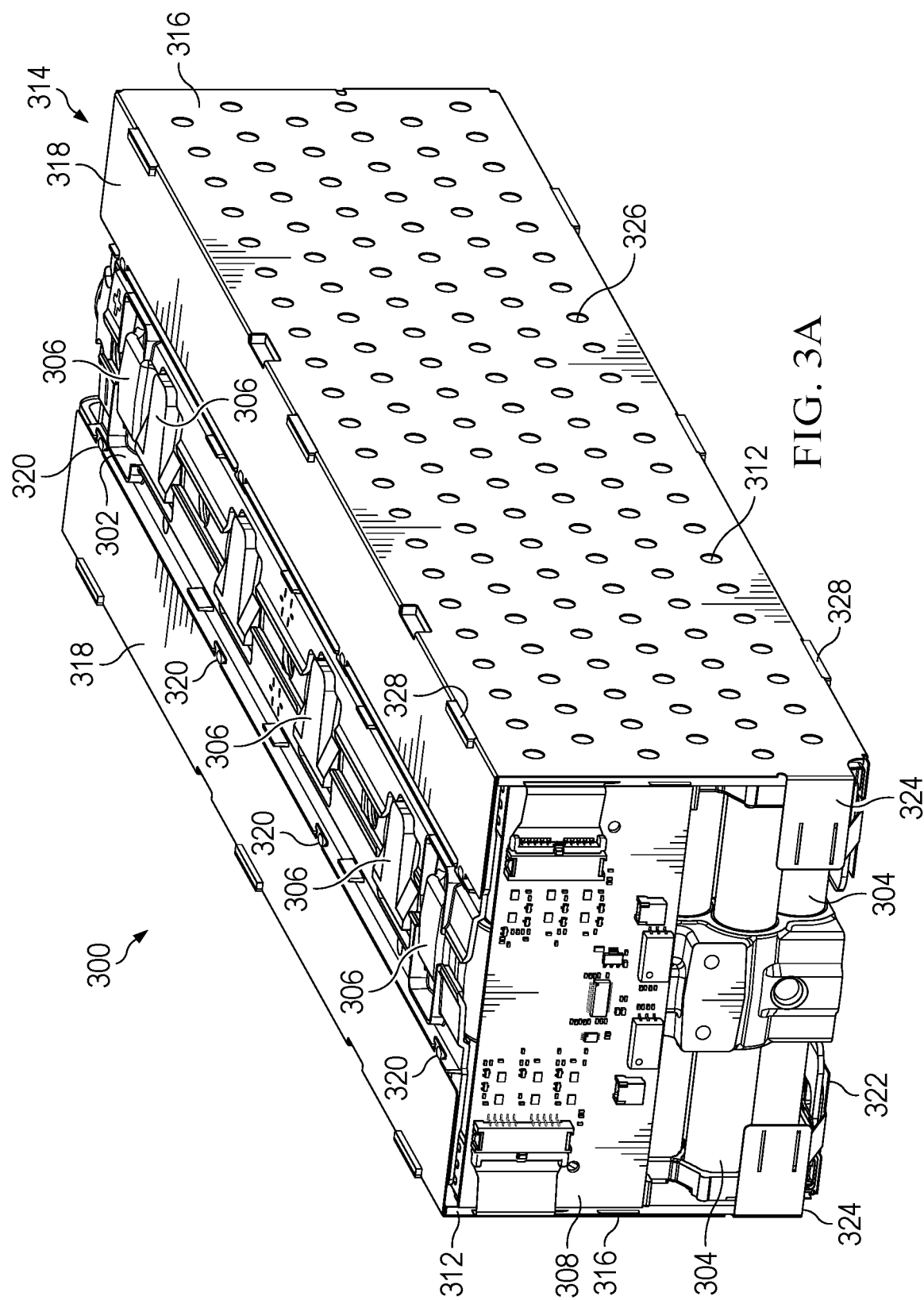
FIGS. 3A-3F illustrate an example battery module in accordance with embodiments of this disclosure.
Figure 3B:
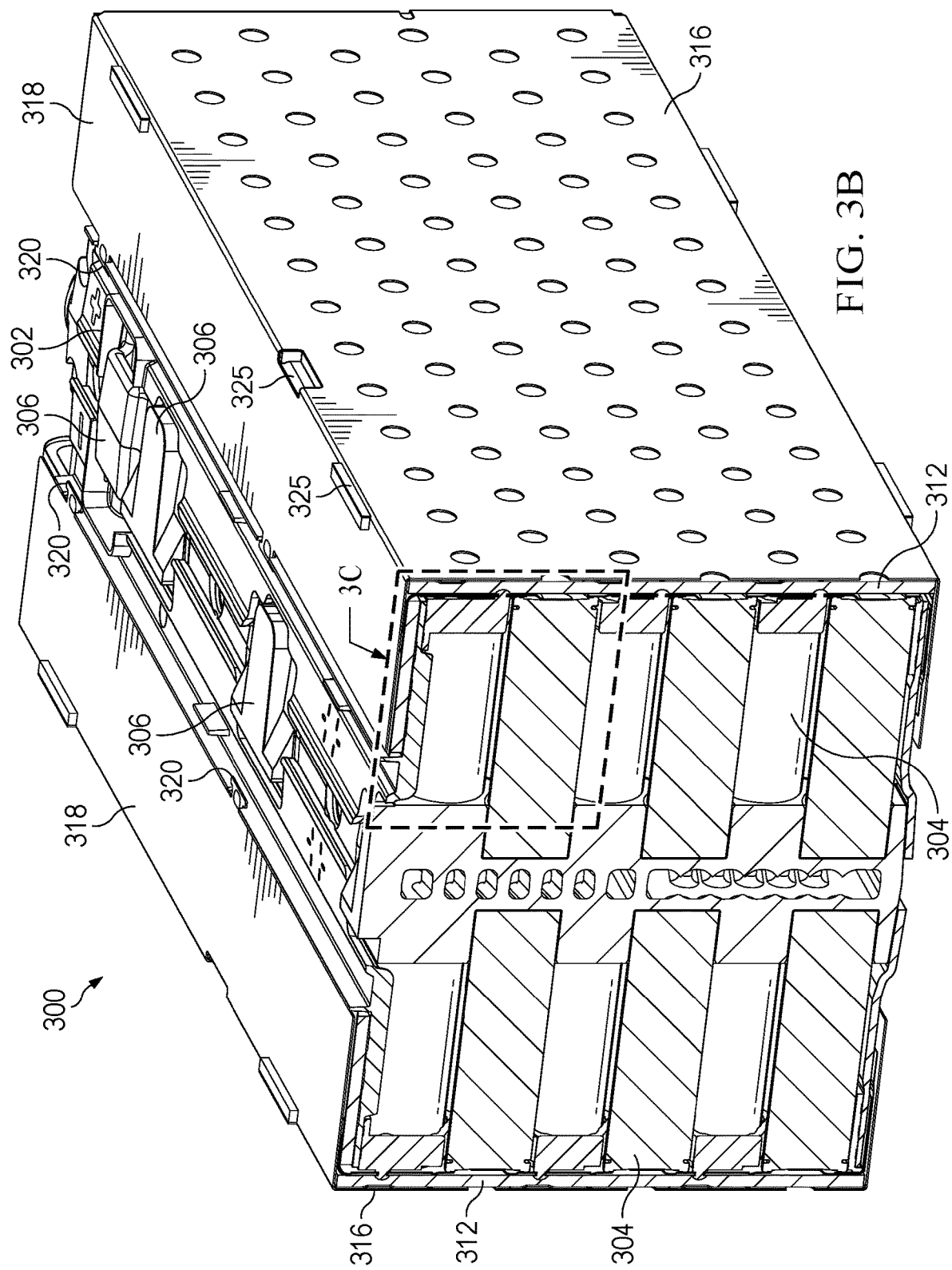
Figure 3C:
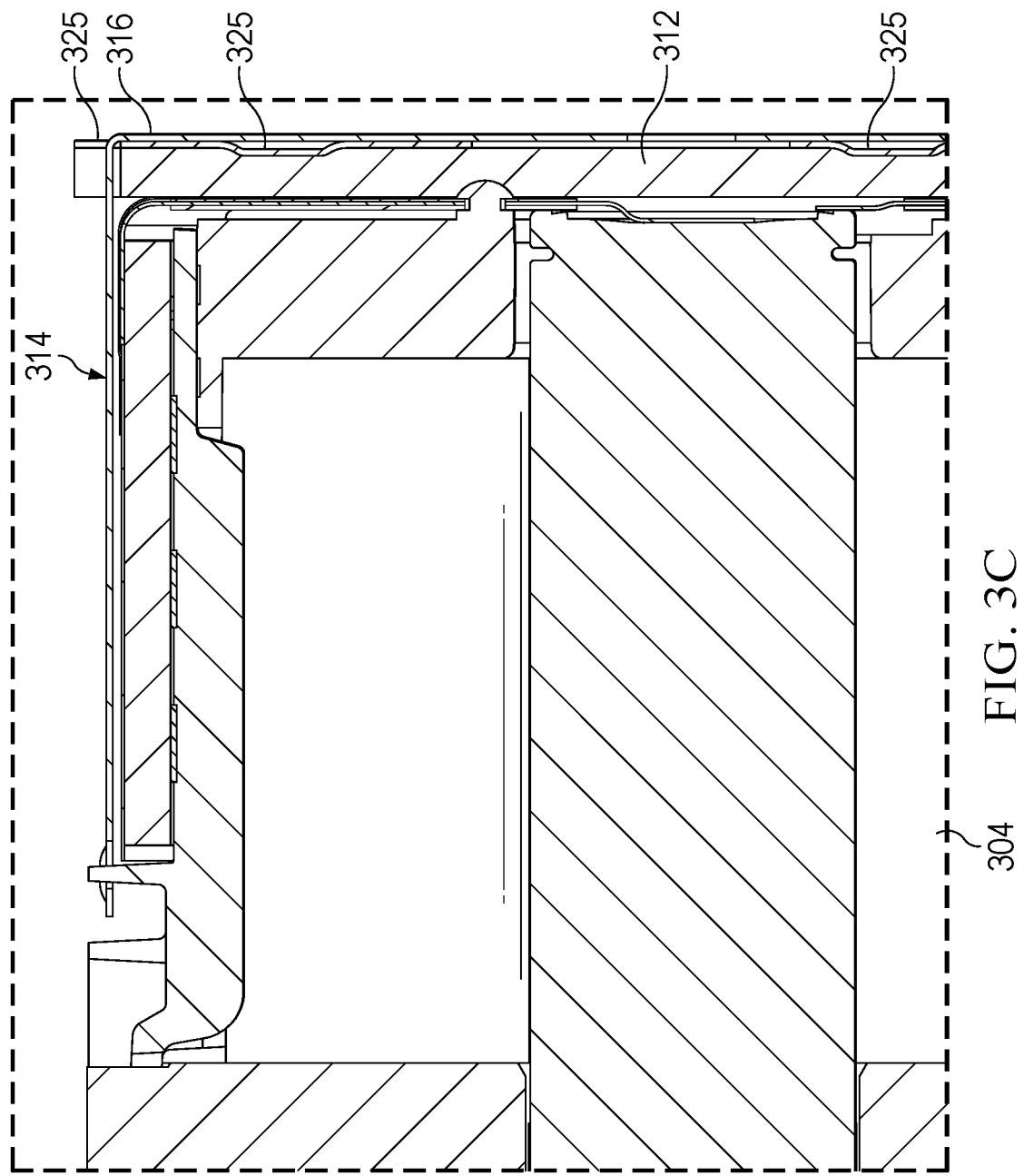
Figure 3D:
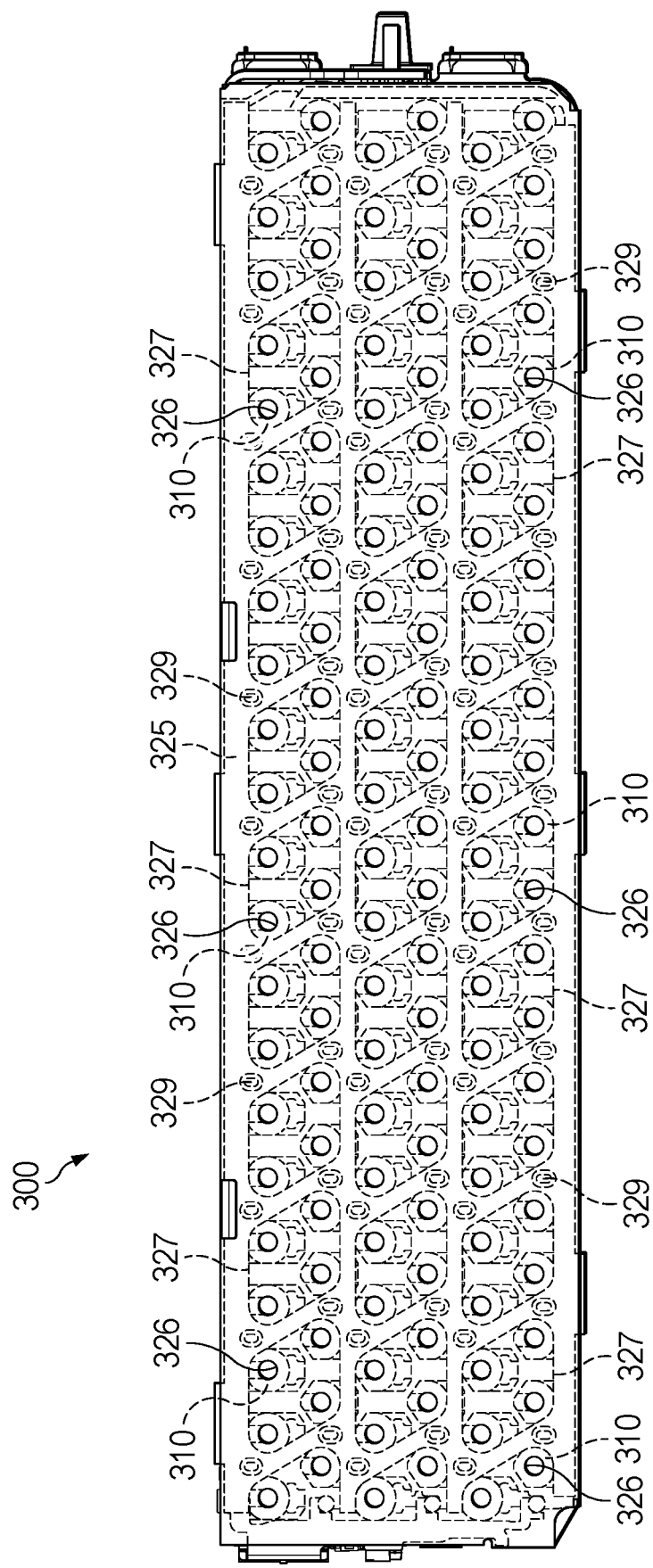
Figure 3E:
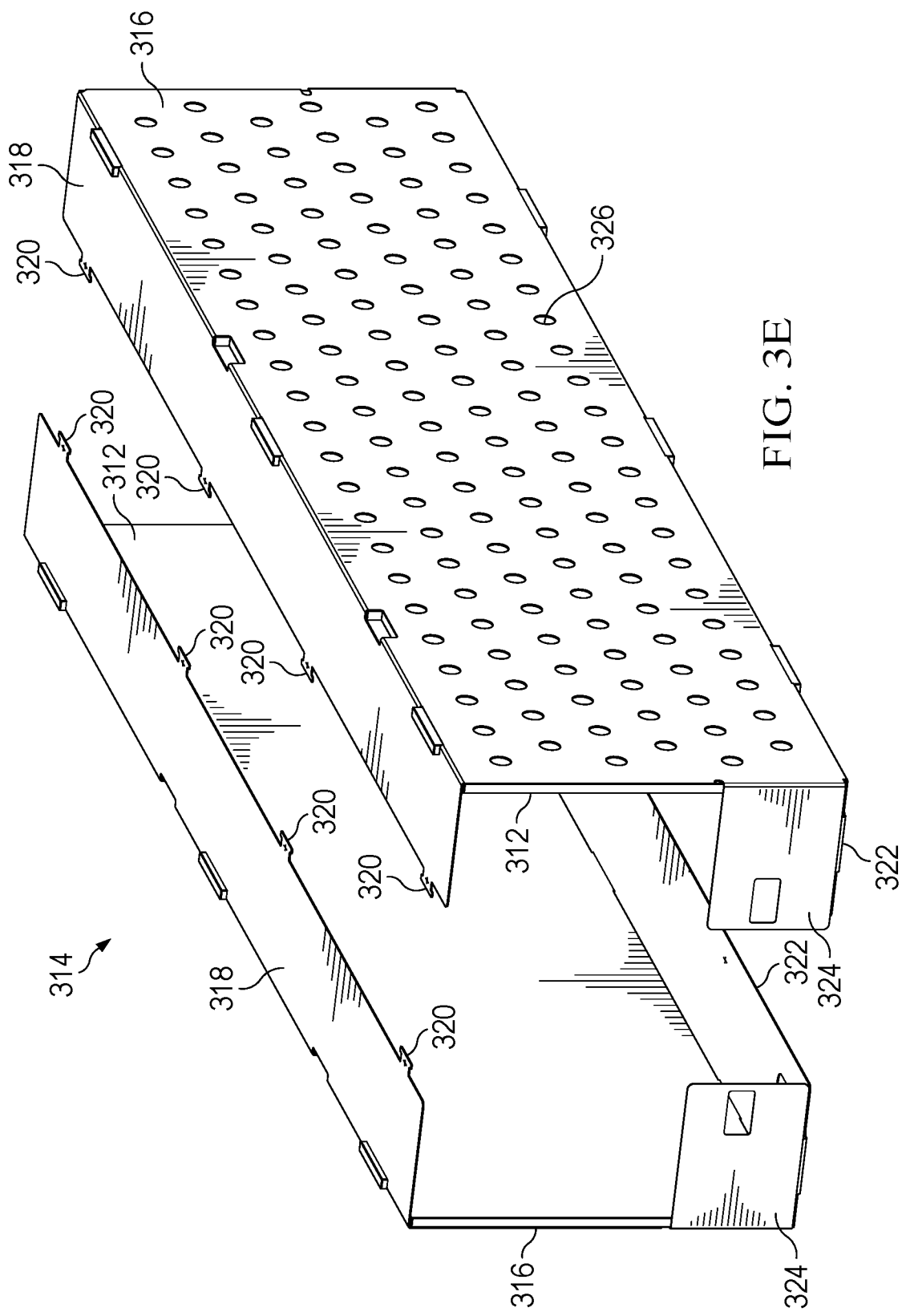
Figure 3F:
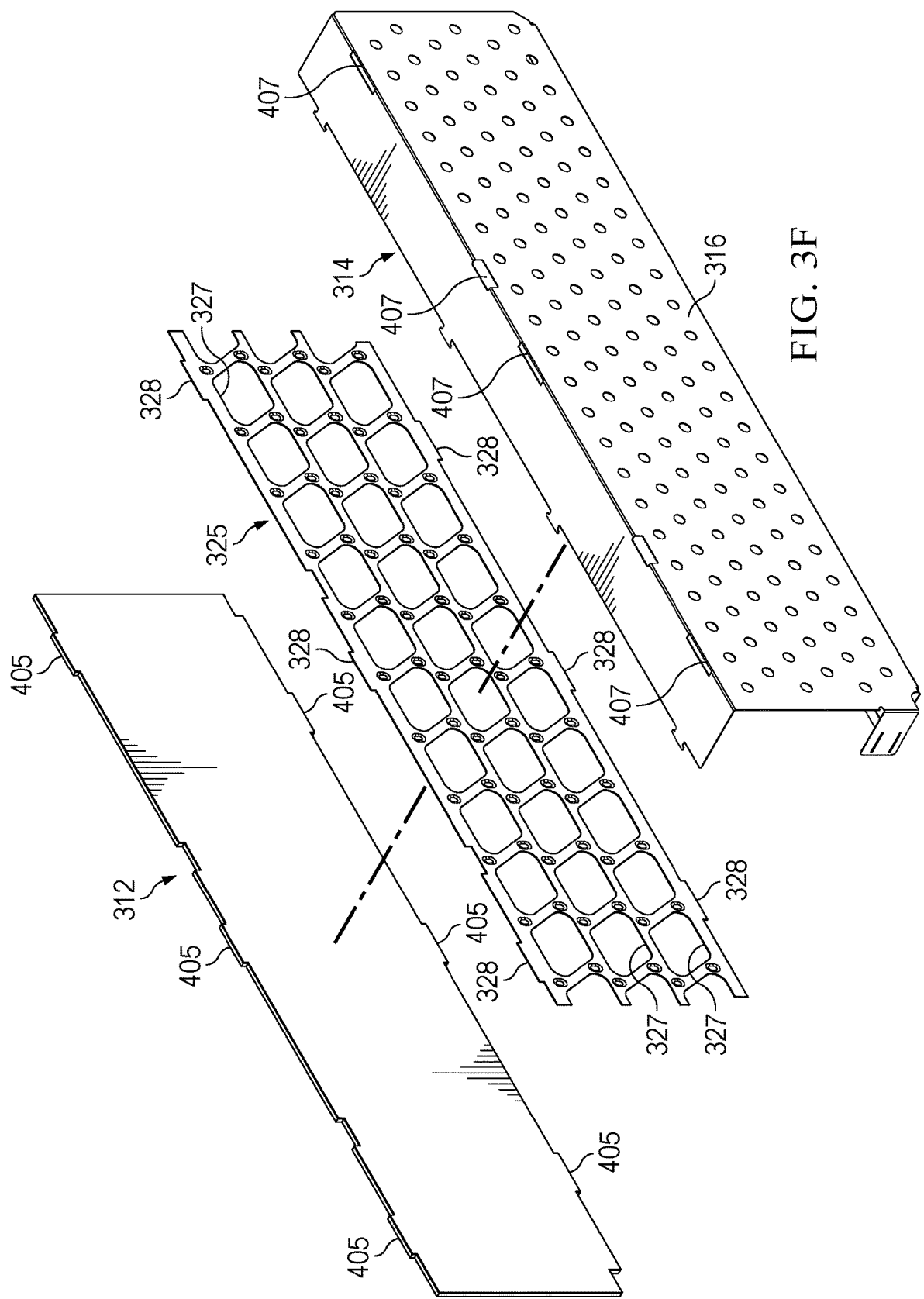

FIGS. 3A-3F illustrate an example battery module 300 in accordance with embodiments of this disclosure. More specifically, FIG. 3A illustrates the battery module 300 fully assembled, FIG. 3B illustrates a cross-sectional view of the battery module 300 showing an internal portion of the battery module 300, FIG. 3C illustrates an enlarged view of a portion of the internal portion of the battery module 300 shown in FIG. 3B, FIG. 3D illustrates a side view of the battery module 300, FIG. 3E illustrates an example protective cover of the battery module 300 in accordance with embodiments of this disclosure, and FIG. 3F illustrates an exploded view of an arrangement of the protective cover of the battery module 300 with a stiffening structure in accordance with embodiments of this disclosure.

As shown in FIGS. 3A-3D, the battery module 300 includes a housing 302 that holds a plurality of lithium-ion battery cells 304, such as via a shelving system. The housing 302 encloses the battery cells 304 and, in various embodiments, is sealed by a retaining or interlocking mechanism 306, such as buckles, clasps, bolts, or other types of hardware. The battery cells 304, as illustrated in FIGS. 3A-3D, can be cylindrical battery cells electrically coupled within the housing 302 to serve as at least a portion of a power source to an electric vehicle, such as electric vehicle 100, or other powered device or system. In some embodiments, the battery module 300 can be installed within a framework for the electric vehicle 100, such as the framework 200.

The battery module 300 further includes a circuit board 308 that can include various components such as one or more processors, sensors, power source connections, etc. The circuit board 308 facilitates various functions of voltage and temperature sensing for diagnostics, cell-to-cell balancing, discharge-power, battery cooling and charging control, and/or alert condition monitoring, such as overcharging, over-discharging, monitoring temperature and thermal runaway. In various embodiments of this disclosure, each battery cell 304 includes a vent 310 having a vent cap to allow for gas or burst fire emissions to exit the battery cell 304 when pressure within the battery cell 304 reaches a preset threshold level. In some embodiments, the vent 310 can include a cap that is destroyed by gases or burst fire exiting the battery cell 304 through the vent 310 upon pressure reaching the pressure threshold. In other embodiments, the cap can mechanically open and close, such as by using a vent valve, when pressure reaches the preset threshold level.

In lithium-ion battery cells, gas that accumulates inside the battery cell is typically generated by the gasification of carbonate solvents and side reactions. The internal pressure of the battery cell will increase when the temperature exceeds the boiling point of any of the components in the solvents. Vaporized solvents can thus erupt and be exhausted from a pouch cell, usually without a vent valve, once the internal pressure increases. A hard case cell with a vent valve can hold for a time until the inner pressure exceeds the opening pressure. Therefore, the rupture temperature for the pouch cells will be near the boiling point of the carbonate that vaporizes first, whereas the rupture temperature for hard-case cells is typically higher. During thermal runaway, the battery cell swells before gas is exhausted. Thermal runaway generates a large amount of heat, and it is the temperature rise that stimulates the rupture of the cell while sparks generated during high-speed venting ignite the flammable gases. Explosive burst fire emission also causes fire propagation to other battery cells. Additionally, due to the extreme heat of an explosive burst fire emission during thermal runaway, the vent cap can still be damaged even if venting of the explosive burst fire emission successfully prevents fire propagation.

Existing techniques for mitigating or retarding fire propagation from cell thermal runaway focus on using a high thermal resistance barrier including intumescent characteristics or a coating that is applied to cover cells to minimize heat conduction or radiation from thermal runaway cells and to absorb heat energy of thermal runaway cells via endothermic reactions from a phase-change transition. However, these techniques are only based on blocking heat energy or fire or absorbing heat energy injection from thermal runaway fire. Also, these techniques do not identify which specific area and location to protect thermally from thermal runaway fire in terms of explosive burst fire direction. Moreover, these techniques do not adequately handle explosive burst fire from rigid packaged cells, which can be a critical source of heat energy that causes fire propagation to surrounding cells.

To prevent or mitigate fire propagation, various embodiments of this disclosure include a thermal insulation barrier around the battery cells in a battery module to protect the cells from thermal runaway, a protective cover to hold the thermal barrier in the correct position, as well as a stiffening structure coupled to the cover and disposed between the cover and the thermal insulation barrier to provide added structural support for the cover. As illustrated in FIGS. 3A-3D and also referring to FIG. 3E, the battery module 300 includes thermal barriers 312 disposed in, coupled to, or adhered within an interior portion of the protective cover 314. In some embodiments, such as the one illustrated in FIGS. 3A-3D and FIG. 3E, the cover 314 can include two side plates 316 having a first exterior side and a second interior side. The thermal barriers 312 are disposed, coupled, or adhered adjacent the second interior side of each side plate 316, such as is illustrated in FIG. 3D and FIG. 3E. The side plates 316 can additionally include upper plates 318 that extend over a top portion of the housing 302 of the battery module 300 and can be secured to the housing 302, such as via brackets 320 that extend over and press against a surface of the housing 302 or via other securing or fastening hardware. The side plates 316 can additionally include lower plates 322 that cover a bottom portion of the housing 302, as well as front plates 324 that cover a portion of a front of the battery module 300. The various plates 316, 322, 324 thus serve to surround and protect the battery cells 304.

The cover 314 can be made from various materials, such as plastic materials like plastic resin, plastic resin matrix reinforced by glass or carbon fiber or metallic materials like aluminum or steel or plastic-film coated metal or plastic resin molded metal metallic. Lithium-ion rechargeable cells have a rigid packaging, such as metal packaging or fiber-reinforced plastic resin wrapped metal packaging. Lithium-ion rechargeable cells in such a rigid packaging, including designated vents, exhibit explosive burst fire as a first step of fire energy release from cell internal thermal runaway. To mitigate, prevent, and stop fire propagation from highly heating up and thermally damaging surrounding battery cells, it is often necessary or desirable to thermally isolate explosive burst fire quickly (such as at or near the beginning of a thermal runaway event) by guiding the explosive burst fire out of the battery module without the explosive burst fire continuing long enough to heat surrounding cells near the cell experiencing thermal runaway.

In this example, the cover 314 further includes a plurality of holes or apertures 326 disposed through the side plates 316. The apertures 326 are aligned with the vents 310 of the battery cells 304 in order to guide explosive burst fire emitted from the vents 310 through the apertures 326 and away from other battery cells 304. The apertures 326 allow for emissions to be guided out and away from the battery module quickly when thermal runaway occurs, without allowing the emissions to remain long enough to heat up surrounding cells 304. This, combined with the thermal barriers 312 insulating the battery cells 304 and absorbing heat energy during thermal runaway and during an explosive burst fire event, mitigates the thermal runaway experienced by a battery cell 304 and prevents fire propagation to other battery cells 304.

The thermal barriers 312 can be made of one or more materials with enough thermal resistance to mitigate and stop fire propagation, as well as insulate the sensitive cell vents 310, which are usually a mechanical weak point and a thin package material that could be easily melted and damaged from explosive burst fire. In some embodiments, the thermal barriers 312 can have a thermal conductivity from about 0.05 W/m*K to about 0.2 W/m*K. In addition, the thermal barriers 312 ideally will not melt from explosive burst fire from cell thermal runaway in order to provide thermal insulation for and protect surrounding cells 304. In some embodiments, the thermal barriers 312 can have a failure temperature above about 800° C. In various embodiments, the thermal barriers 312 are soft and/or porous thermal barriers to facilitate air flow, have a mechanical tensile strength below about 150 kPa, and are made from materials such as ceramic wool, fabric, gels and foams (which may be formed using silicone, calcium oxide, ceramic powder, glass wool, etc.) that provide high levels of thermal resistance to prevent thermal damage to cells 304 without melting from fire caused by cell thermal runaway.

Strong and rigid thermal barriers, such as high mechanical strength ceramic or glass wool or fabric, ceramic plate barriers, rock wool barriers, etc., can block explosive burst fire from being emitted quickly through the apertures 326, holding the explosive burst fire within the cover 314 and potentially damaging cells 304 and allowing fire propagation. The thermal barrier 312 can be of varying thickness, where its thickness may vary depending on the amount of space between the battery cells 304 and the cover 314. In some cases, the thermal barrier 312 may have a nominal thickness of about 3 mm. The variations in the thickness of the thermal barrier 312 can vary depending on various factors, such as the material of the thermal barriers 312 and/or the energy absorption needed by the thermal barriers 312.

As illustrated in FIGS. 3A-3D and in FIG. 3F, a stiffening structure 325 is coupled to each side plate 316 of the cover 314, and is disposed between each side plate 316 of the cover 314 and each thermal barrier 312. Existing battery modules and battery pack designs are highly integrated into the skateboard system. Due to space limitations, battery module enclosure designs tend to be very thin, such as around 0.43 mm, to avoid clashing with other battery components. It can therefore be very challenging for such thin enclosure designs to meet functionality safety requirements such as retarding fire propagation during the thermal event, which usually comes with the releasing of high burst pressure and a large volume of hot gas. In this regard, a battery module enclosure with a thermal barrier, including the cover 314 of the various embodiments of this disclosure, could easily get burned and damaged, resulting in decreased rigidity during a thermal event which could negatively affect the thermal insulation such as by blocking the heat transfer from cell to cell. Additionally, options for battery module enclosure design with thermal insulations are very limited in terms of choosing the right materials and the manufacturing processes. Common processes like injection molding have minimum thickness requirements and plastics parts with thin layers are usually flimsy. Sheet metal parts are usually heavier compared to plastics and they need extra coating to provide dielectric insulations, which is difficult to achieve due to the sharp edge from manufacturing processes.

To address the above issues, various embodiments of this disclosure incorporate the stiffening structure 325 a cover of a battery module, such as the cover 314 of the battery module 300. For example, each side plate 316 of the cover 314 is laminated with a stiffening structure 325 and a thermal barrier 312, with the stiffening structures 325 providing stiffness and strength to maintain structural integrity of the cover 314 when a thermal event occurs. The stiffening structure 325 can be attached to the cover 314 via an adhesive, via mechanical locking features, such as tabs 328 as shown in FIGS. 3A and 3F, or both. In some embodiments, the tabs 328 of the stiffening structure 325 correspond to tabs 405 of the thermal barrier 312. The tabs 328, 405 can be located at various positions along top and bottom edges of stiffening structure 325 and the thermal barrier 412, respectively. The tabs 328, 405 securely fit within cutouts 407 of the cover 314 to mechanically couple the thermal barrier 312 to the cover 314 on an interior side of the side plate 316 of the cover 314.

Additionally, as shown in FIGS. 3D and 3F, the stiffening structure 325 includes cutouts or apertures 327 to ensure combustible gases and high pressure can be released during a thermal runaway event. In some embodiments, as shown in FIGS. 3D and 3F, the cutouts 327 can be sized and shaped to correspond to multiple vents 310 of the battery cells 304 and multiple apertures 326 of the cover 314 to provide for increased airflow for the vents 310. As one example, the embodiment illustrated in FIG. 3D shows that the cutouts 327 of the stiffening structure are sized and shaped to fit around four vents 310 and apertures 326.

Also, as shown in FIG. 3D, the stiffening structure 325 includes additional stamped or indented portions 329 that provide additional rigidity and help to press the thermal barrier 312 against the battery cells 304 for better thermal insulation, eliminating air gaps between the thermal barrier 312 and the battery cells 304.

The stiffening structure 325 can be made of various materials such as alumina-silica fiber reinforced composite or phlogopite plate. These materials have high temperature resistance, high strength, and high stiffness, which make them advantageous for use in electric vehicle battery system safety and in prevention of thermal runaway. For example, for alumina-silica fiber reinforced composite and phlogopite plate, both materials have temperature resistance more than 1200-degree Celsius, and high dielectric strength for high voltage battery applications. In terms of mechanical properties, phlogopite plate has a tensile strength of 160 MPa and a young's modulus of 5.6 GPa. Alumina-silica fiber reinforced composite has a tensile strength of 1200 MPa and a young's modulus of 300 GPa. Both materials also have excellent forming capability for achieving different shapes.

Existing battery module enclosures that incorporate some form of thermal insulation rely on adhesive-, silicone- or polyurethane-based potting materials to achieve proper thermal insulation. Those potting materials add additional weight to the battery module. Also, they are usually applied separately into the battery module or pack, which is not efficient for assembly. These methods also have limitations for a battery pack design with a very small space (e.g., a skateboard chassis) because those potting material would typically expand once cured. This expansion might damage the welded busbars on the battery cell if the potting material is constrained in a small amount of space.

The embodiments of this disclosure address the above issues. The battery module enclosures of the present disclosure are comprised of fewer parts, e.g., a plastic cover, a stiffening structure, and a thermal barrier. Because of the unique design with a focus on a design for assembly of the component parts, this three-part assembly will be held tightly by either adhesives or built-in features designed to serve as mechanical locks. Also, the assembly has mounting features incorporating a slit design (e.g., tabs 328, 405 fitting within cutouts 307) which provides easier mounting of the enclosure on the battery module using assembly methods such as heat staking, and without requiring use of additional fasteners.

Another advantage of the battery module enclosure of the various embodiments of this disclosure is that the battery module enclosure and thermal insulation material is highly integrated. The structure itself is very thin (within 1 mm). In this regard, it is very suitable for battery pack designs with very tight spaces to achieve lightweight and high battery energy density. Also, the battery module enclosure of the various embodiments of this disclosure is advantageous for various battery cell orientations and different design configurations, such as for both prismatic and cylindrical cell configurations.

Although FIGS. 3A-3F illustrate one example of a battery module 300 and its various components, those skilled in the art will recognize that various changes may be made to the examples of FIGS. 3A-3F. For example, the cover 314 may be a singular component, rather than two separate components, formed or shaped to at least partially enclose or surround the battery module 300. Additionally, the overall structure of the battery module 300, the stiffening structure 325, the thermal barrier 312, and/or the cover 314 may differ without departing from the scope of this disclosure, such as by altering the dimensions of the battery module 300, the stiffening structure 325, the thermal barrier 312, and/or the cover 314, the arrangement of the apertures 326 so as to align with vents 310, the number of battery cells, the arrangement of the battery cells, and so on.

Figure 4A:
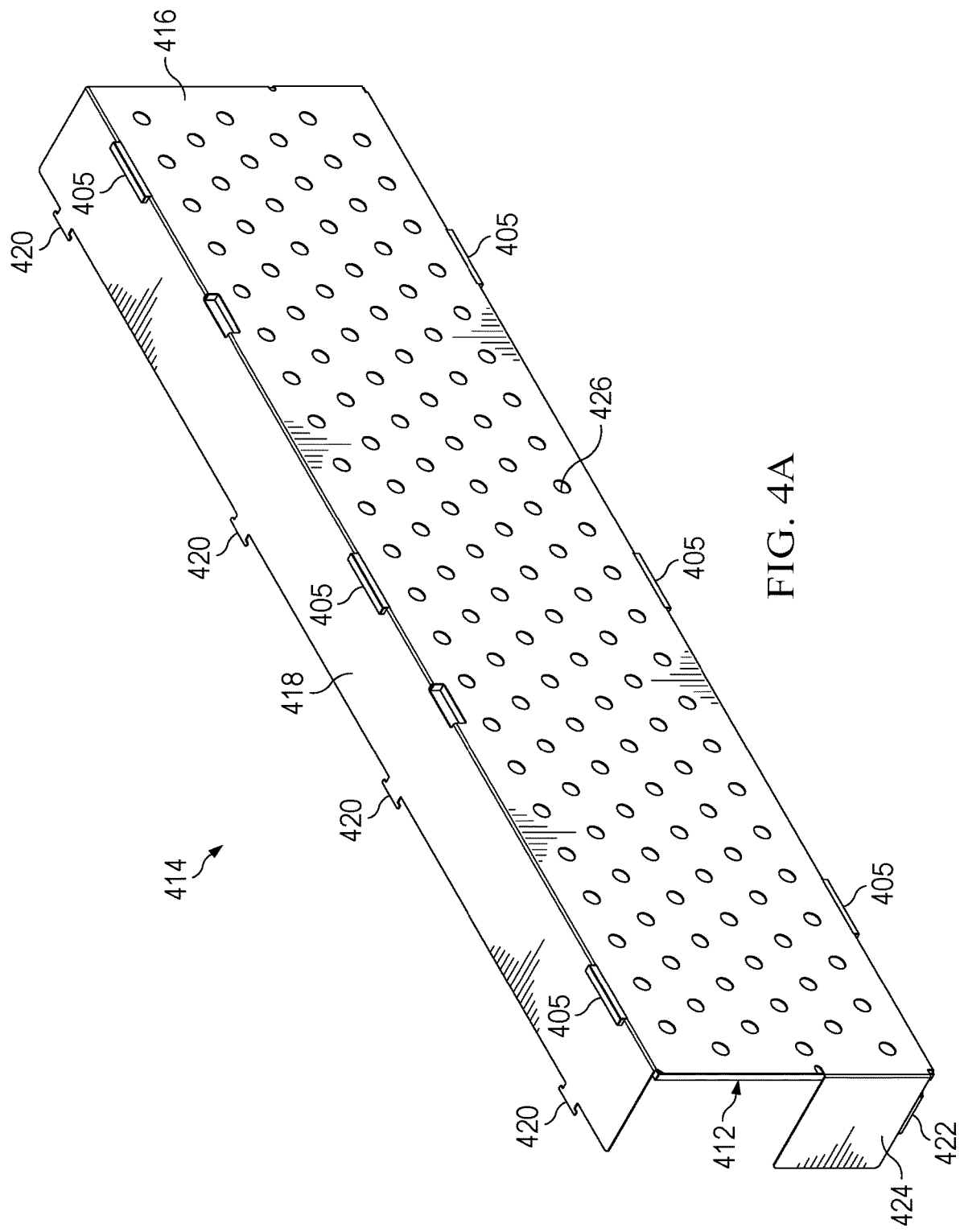
FIGS. 4A-4C illustrate an example protective cover in accordance with embodiments of this disclosure.
Figure 4B:
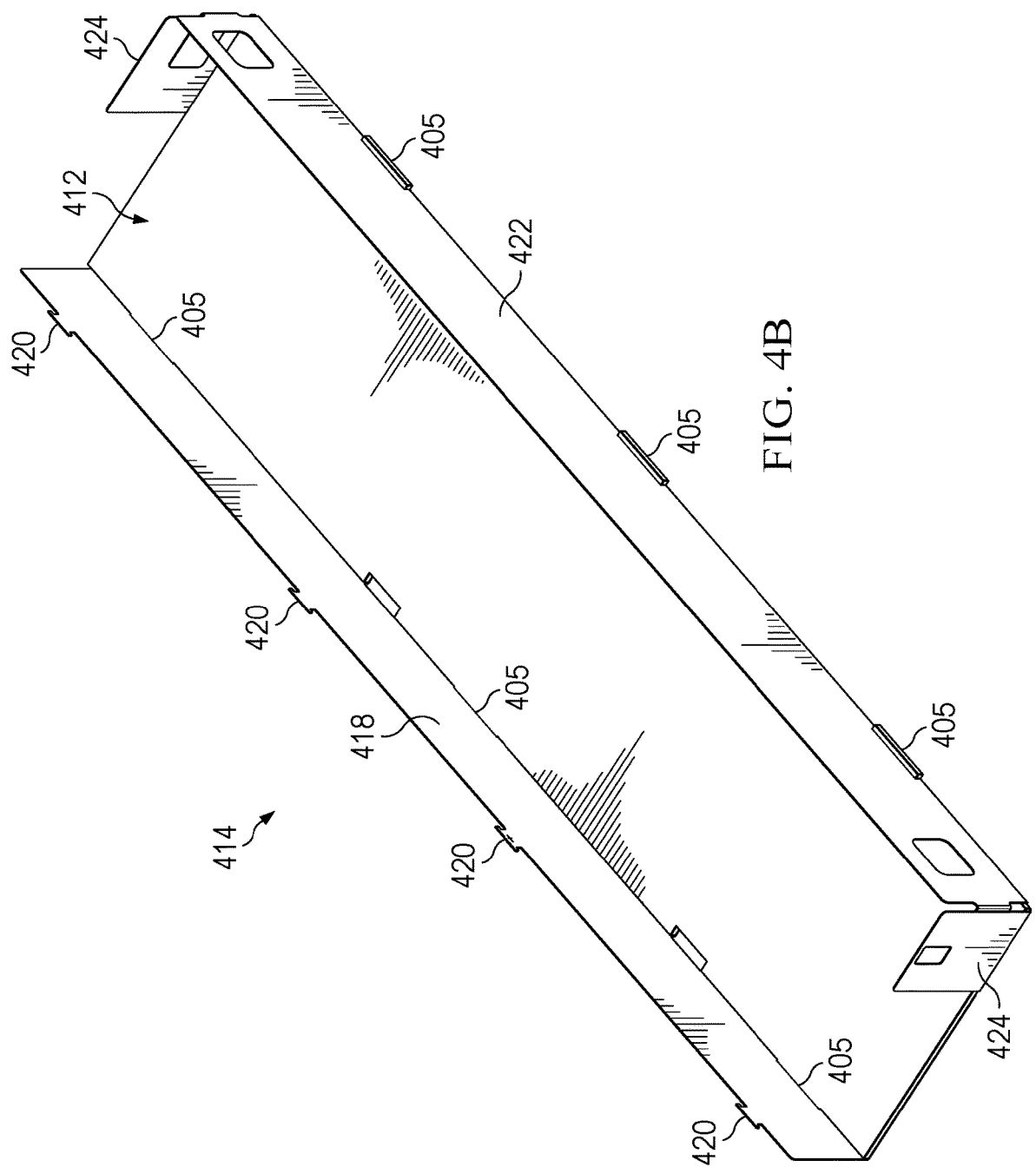
Figure 4C:
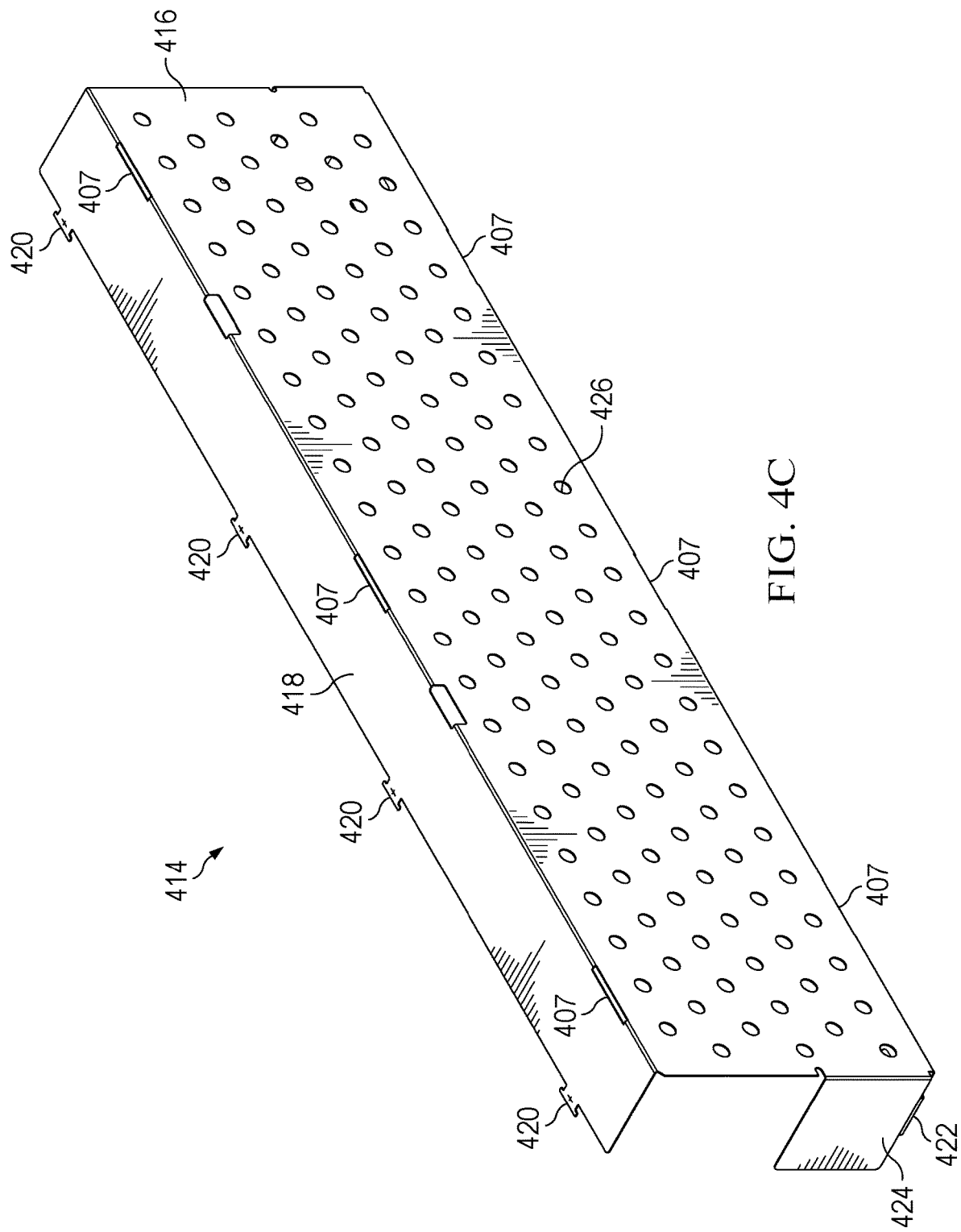
Figure 4D:
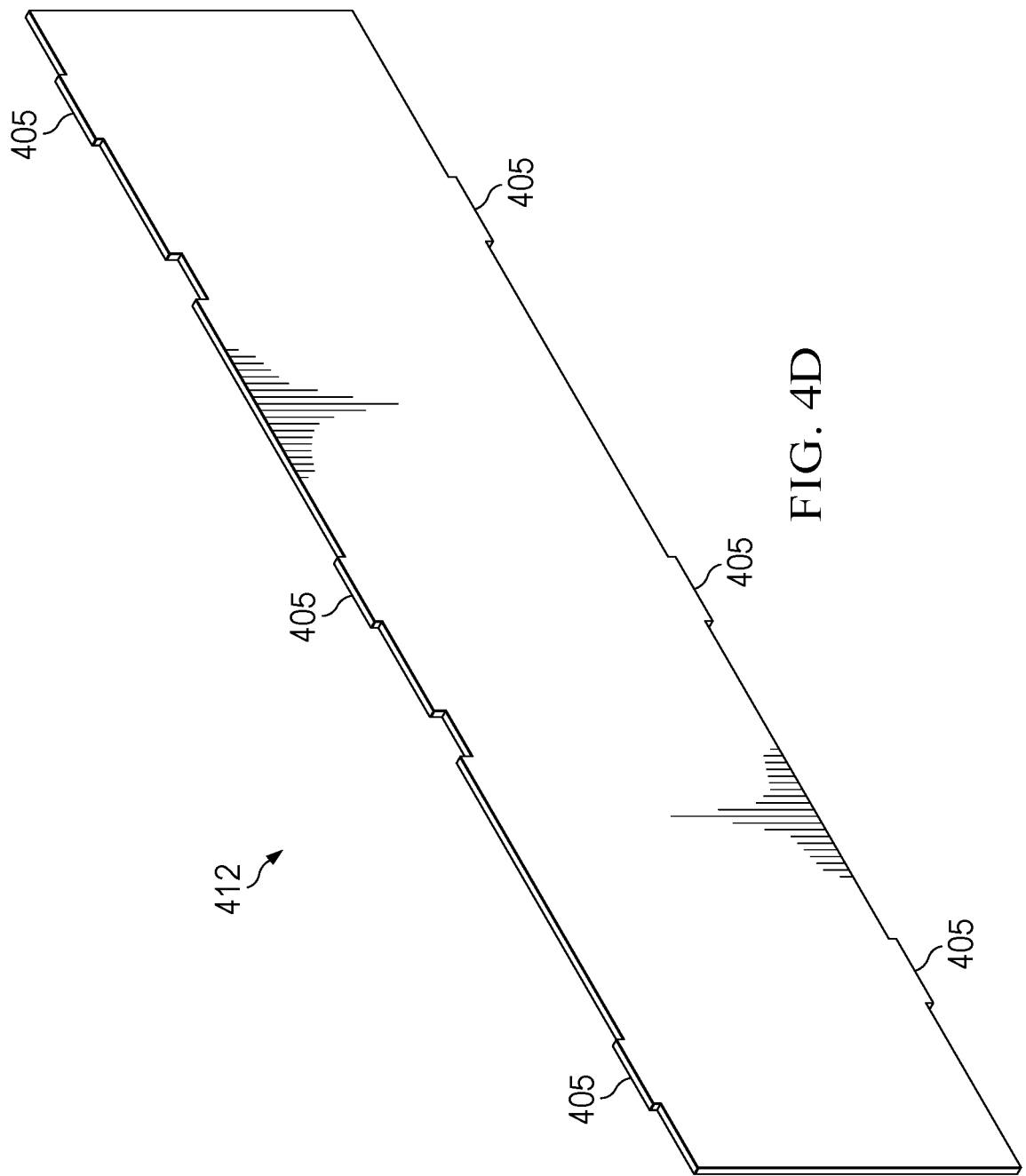
FIG. 4D illustrates an example thermal barrier in accordance with embodiments of this disclosure.

FIGS. 4A-4C illustrate an example protective cover 414 in accordance with embodiments of this disclosure and FIG. 4D illustrates an example thermal barrier 412 in accordance with embodiments of this disclosure. It will be understood that the protective cover 414 illustrated in FIGS. 4A-4C can be one half of a full protective cover that covers a battery module, with the other half of the full protective cover mirroring the components of the protective cover 414, such as shown and described in FIGS. 3A-3D.

The cover 414 includes side plate 416 having a first exterior side and a second interior side. The example protective cover 414 includes a thermal barrier 412 disposed on the second interior side. In this example, the thermal barrier 412 includes extruded tabs 405 located at various positions along top and bottom edges of the thermal barrier 412. The extruded tabs 405 securely fit within cutouts 407 of the cover 414 to mechanically couple the thermal barrier 412 to the cover 414 on the second interior side of the cover 414.

The side plate 416 can additionally include an upper plate 418 that extends over a top portion of a battery module, such as battery module 300, and can be secured to a housing of the battery module, such as housing 302, such as via brackets 420 that extend over and press against a surface of the housing or via other securing or fastening hardware. The side plate 416 can additionally include a lower plate 422 that covers a bottom portion of the housing of a battery module, as well as a front plate 424 that covers a portion of a front of a battery module. The various plates 416, 422, 424 thus serve to surround and protect battery cells of a battery module.

The cover 414 can be made from various materials, such as plastic materials like plastic resin, plastic resin matrix reinforced by glass or carbon fiber or metallic materials like aluminum or steel or plastic-film coated metal or plastic resin molded metal metallic. Lithium-ion rechargeable cells have a rigid packaging, such as metal packaging or fiber-reinforced plastic resin wrapped metal packaging. Lithium-ion rechargeable cells in such a rigid packaging, including designated vents, exhibit explosive burst fire as a first step of fire energy release from cell internal thermal runaway. To mitigate, prevent, and stop fire propagation from highly heating up and thermally damaging surrounding battery cells, it is often necessary or desirable to thermally isolate explosive burst fire quickly (such as at or near the beginning of a thermal runaway event) by guiding the explosive burst fire out of the battery module without the explosive burst fire continuing long enough to heat surrounding cells near the cell experiencing thermal runaway.

In this example, the cover 414 further includes a plurality of holes or apertures 426 disposed through the side plate 416. The apertures 426 are arranged so as to align with the vents of battery cells in order to guide explosive burst fire emitted from the vents through the apertures 426 and away from other battery cells. The apertures 426 allow for emissions to be guided out and away from the battery module quickly when thermal runaway occurs, without allowing the emissions to remain long enough to heat up surrounding cells. This, combined with the thermal barrier 412 insulating the battery cells and absorbing heat energy during thermal runaway and during an explosive burst fire event, mitigates the thermal runaway experienced by a battery cell and prevents fire propagation to other battery cells.

The thermal barrier 412 can be made of one or more materials with enough thermal resistance to mitigate and stop fire propagation, as well as insulate the sensitive cell vents, which are usually a mechanical weak point and a thin package material that could be easily melted and damaged from explosive burst fire. In some embodiments, the thermal barrier 412 can have a thermal conductivity from about 0.05 W/m*K to about 0.2 W/m*K. In addition, the thermal barrier 412 ideally will not melt from explosive burst fire from cell thermal runaway in order to provide thermal insulation for and protect surrounding cells. In some embodiments, the thermal barrier 412 can have a failure temperature above about 800° C. In various embodiments, the thermal barrier 412 is a soft and/or porous thermal barrier to facilitate air flow, have a mechanical tensile strength below about 150 kPa, and is made from materials such as ceramic wool, fabric, gel and foams (which may be formed using silicone, calcium oxide, ceramic powder, glass wool, etc.) that provide high levels of thermal resistance to prevent thermal damage to battery cells without melting from fire caused by cell thermal runaway.

The thermal barrier 412 can be of varying thickness, where its thickness may vary depending on the amount of space between the battery cells and the cover 414. In some cases, the thermal barrier 412 may have a nominal thickness of about 3 mm. The variations in the thickness of the thermal barrier 412 can vary depending on various factors, such as the material of the thermal barrier 412 and/or the energy absorption needed by the thermal barrier 412.

Although FIGS. 4A-4D illustrate one example of a protective cover 414 and a thermal barrier 412, those skilled in the art will recognize that various changes may be made to the examples of FIGS. 4A-4D. For example, the cover 414 may be a singular component, rather than two separate components, formed or shaped to at least partially enclose or surround a battery module. Additionally, the overall structure of the thermal barrier 412 and/or the cover 414 may differ without departing from the scope of this disclosure, such as by altering the dimensions of the thermal barrier 412 and/or the cover 414 to account for different sizes or dimensions of a battery module, altering the arrangement of the apertures 426 so as to align with vents of battery cells, and so on. Additionally, although FIGS. 4A-4D do not illustrate the inclusion of a stiffening structure, such as the stiffening structure 325, it will be understood that such a stiffening structure can be included between the cover 414 and the thermal barrier 412.

Figure 5A:
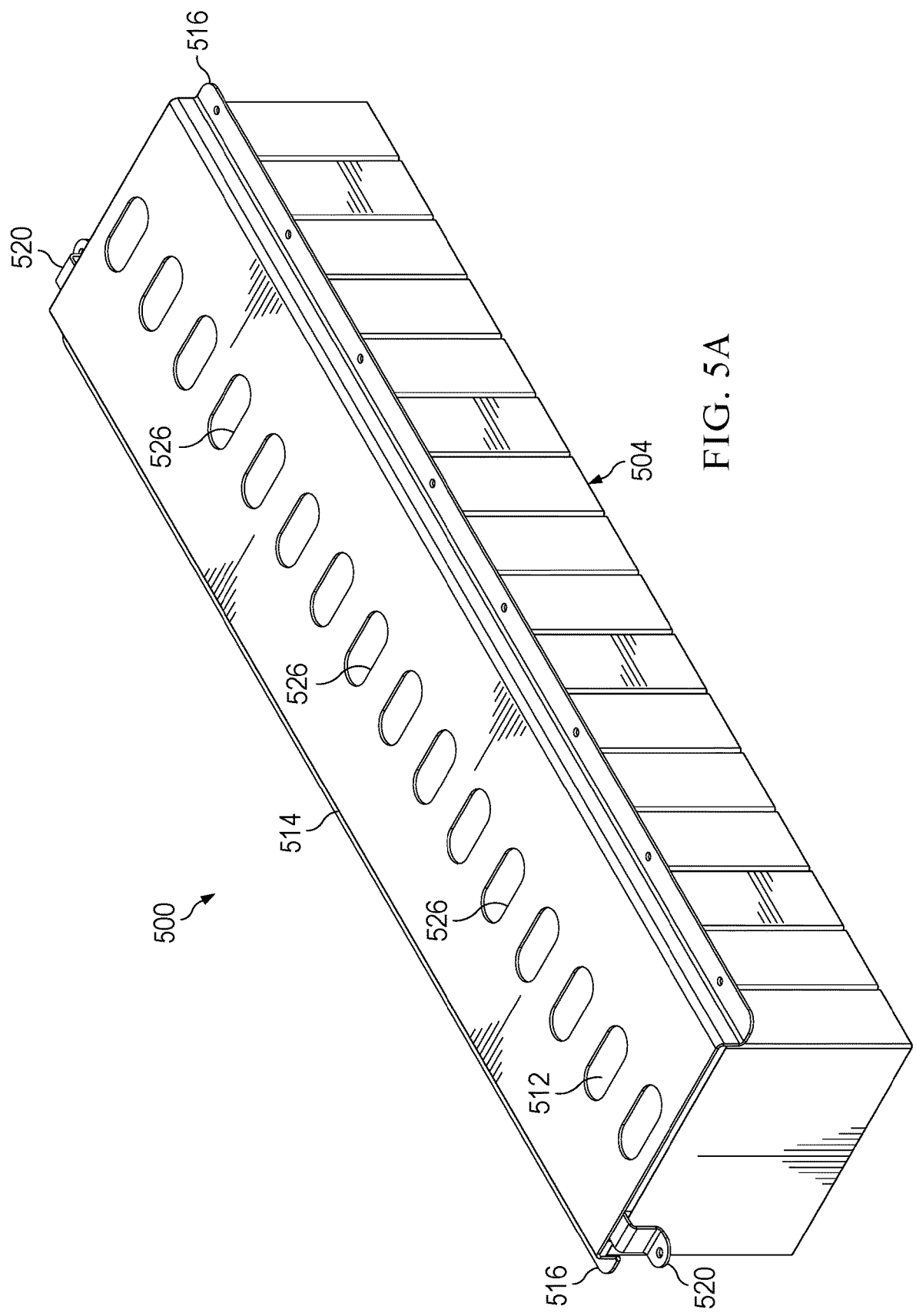
FIGS. 5A-5C illustrate an example prismatic cells battery module in accordance with embodiments of this disclosure.
Figure 5B:
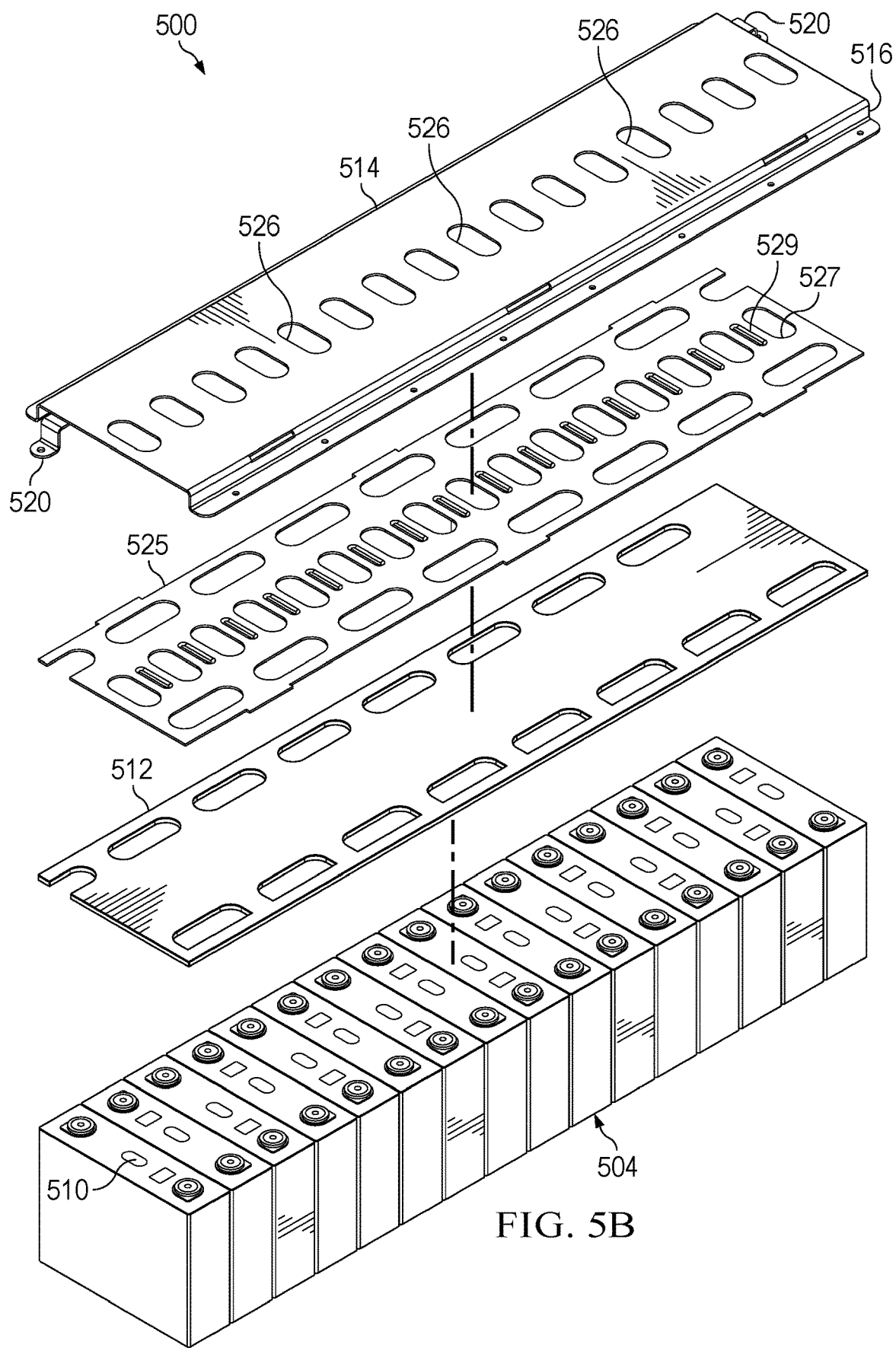
Figure 5C:
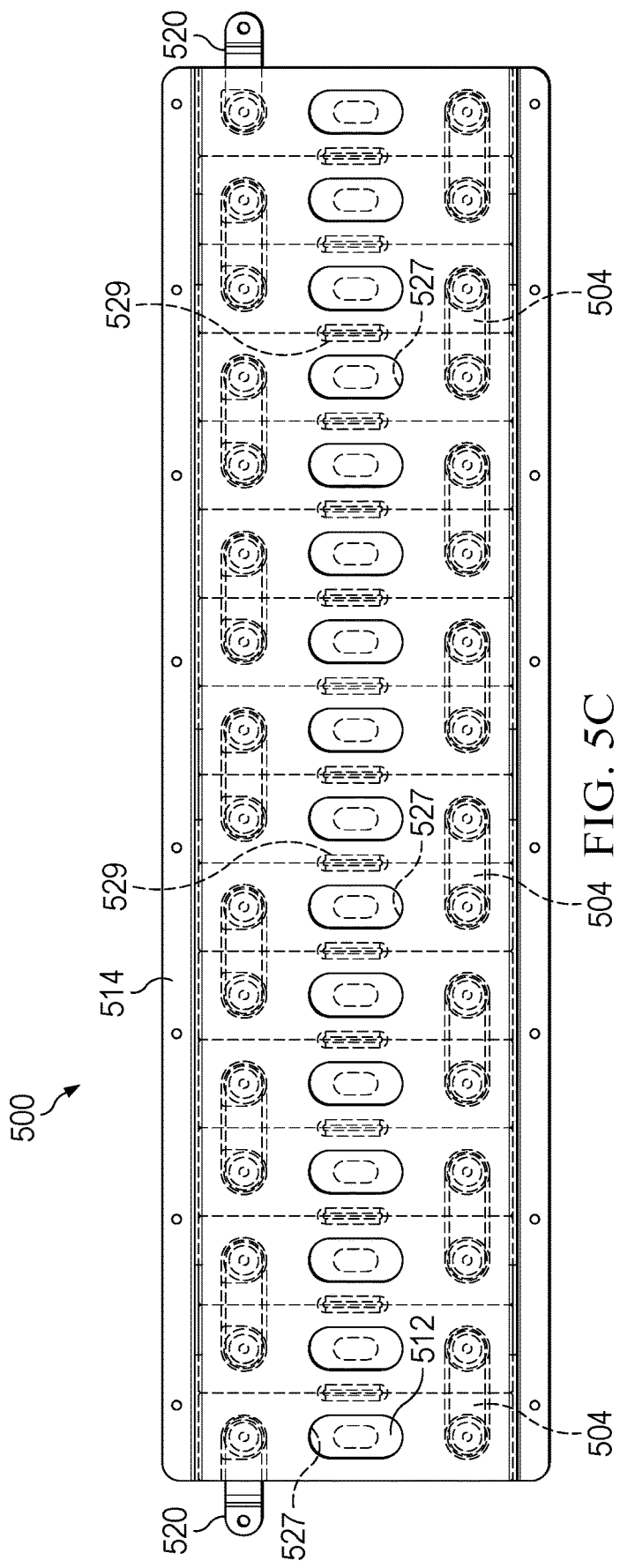

FIGS. 5A-5C illustrate an example prismatic cells battery module 500 in accordance with embodiments of this disclosure. More specifically, FIG. 5A illustrates the battery module 500 fully assembled, FIG. 5B illustrates an exploded view of the battery module 500, and FIG. 5C illustrates a top view of the battery module 500 showing a stiffening structure and thermal barrier.

As shown in FIGS. 5A-5C, the battery module 500 includes a plurality of lithium-ion battery cells 504, such as prismatic can battery cells. As shown in FIGS. 5A-5C (and in FIGS. 3A-3F described above), the covers and thermal barriers of this disclosure can have a variety of shapes, dimensions, and configurations depending (among other things) on the types of battery cells to be protected and/or the environment or structure in which the battery cells are stored. In some embodiments, the battery cells 504 illustrated in FIGS. 5A-5C can be stored in a housing, frame, or other structure. The battery cells 504 can be electrically coupled together to serve as at least a portion of a power source to an electric vehicle, such as the electric vehicle 100, or other powered device or system. In some embodiments, the battery module 500 can be installed within a framework for the electric vehicle 100, such as the framework 200.

In various embodiments of this disclosure, each battery cell 504 includes a vent 510 having a vent cap to allow for gas or burst fire emissions to exit the battery cell 504 when pressure reaches a preset threshold level. In some embodiments, the vent 510 can include a cap that is destroyed by gases or burst fire exiting the battery cell 504 through the vent upon pressure reaching the pressure threshold. In other embodiments, the cap can mechanically open and close, such as by using a vent valve, when pressure reaches the preset threshold level.

To prevent or mitigate fire propagation, the battery module 500 includes a thermal insulation barrier 512 placed against the battery cells 504 to protect the cells 504 from thermal runaway. The battery module 500 also includes a protective cover 514 to hold the thermal barrier 512 in the correct position. In some embodiments, the thermal barrier 512 can be disposed in, coupled to, or adhered within an interior portion of the protective cover 514. In some embodiments, the cover 514 can include one or more high voltage busbars 520 for electrically connecting components.

As also illustrated in FIGS. 5B and 5C, the battery module 500 further includes a stiffening structure 525 in accordance with embodiments of this disclosure. The stiffening structure 525 is coupled to the cover 514, and is disposed between the cover 514 and the thermal barrier 512. The cover 314 can be laminated with the stiffening structure 525 and the thermal barrier 512, with the stiffening structure 525 providing stiffness and strength to maintain structural integrity of the cover 514 when a thermal event occurs. The stiffening structure 525 can be attached to the cover 514 via mechanical locking features, via an adhesive, or both.

Additionally, as shown in FIGS. 5B and 5C, the stiffening structure 525 includes cutouts or apertures 527 to ensure combustible gases and high pressure can be released during a thermal runaway event. In some embodiments, each cutout 527 can be sized and shaped to correspond to multiple vents 510 of the battery cells 304 or a single vent 510 of a battery cell 504. Also, as shown in FIGS. 5B and 5C, the stiffening structure 525 can include additional stamped or indented portions 529 that provide additional rigidity and help to press the thermal barrier 512 against the battery cells 504 for better thermal insulation, eliminating air gaps between the thermal barrier 512 and the battery cells 504.

The stiffening structure 525 can be made of various materials such as alumina-silica fiber reinforced composite or phlogopite plate. These materials have high temperature resistance, high strength, and high stiffness, which make them advantageous for use in electric vehicle battery system safety and in prevention of thermal runaway. For example, for alumina-silica fiber reinforced composite and phlogopite plate, both materials have temperature resistance more than 1200-degree Celsius, and high dielectric strength for high voltage battery applications. In terms of mechanical properties, phlogopite plate has a tensile strength of 160 MPa and a young's modulus of 5.6 GPa. Alumina-silica fiber reinforced composite has a tensile strength of 1200 MPa and a young's modulus of 300 GPa. Both materials also have excellent forming capability for achieving different shapes.

In some embodiments, the cover 514 can include two side plates 516 that extend a distance along sides of the battery cells 504 to prevent the cover 514 from moving, and can include a portion extending a distance away from the battery cells 504. In various embodiments, the cover 514 can also be secured to battery cells 504, such as via securing or fastening hardware. For example, as shown in FIGS. 5A-5C, the side plates 516 of the cover 514 can include a plurality of mounting holes or apertures. The mounting holes can, in various embodiments, be used to secure the battery module 500 to structures such as a module crossmember within a vehicle framework, such as framework 200, within an electric vehicle, such as vehicle 100.

The cover 514 can be made from various materials, plastic materials like plastic resin, plastic resin matrix reinforced by glass or carbon fiber or metallic materials like aluminum or steel or plastic-film coated metal or plastic resin molded metal metallic. Again, lithium-ion rechargeable cells have a rigid packaging, such as metal packaging or fiber-reinforced plastic resin wrapped metal packaging. Lithium-ion rechargeable cells in such a rigid packaging, including designated vents, exhibit explosive burst fire as a first step of fire energy release from cell internal thermal runaway. To mitigate, prevent, and stop fire propagation from highly heating up and thermally damaging surrounding battery cells, it is often necessary or desirable to thermally isolate explosive burst fire quickly (such as at or near the beginning of a thermal runaway event) by guiding the explosive burst fire out of the battery module without the explosive burst fire continuing long enough to heat surrounding cells near the cell experiencing thermal runaway. Here, the cover 514 further includes a plurality of holes or apertures 526 disposed through the cover 514. The apertures 526 are aligned with the vents 510 of the battery cells 504 in order to guide explosive burst fire emitted from the vents 510 through the apertures 526 and away from other battery cells 504. This, combined with the thermal barrier 512 insulating the battery cells 504 and absorbing heat energy during thermal runaway and during an explosive burst fire event, mitigates the thermal runaway experienced by a battery cell 504 and prevents fire propagation to other battery cells 504.

The thermal barriers 512 can be made of one or more materials with enough thermal resistance to mitigate and stop fire propagation, as well as insulate the sensitive cell vents 510, which are usually a mechanical weak point and a thin package material that could be easily melted and damaged from explosive burst fire. In some embodiments, the thermal barriers 512 can have a thermal conductivity from about 0.05 W/m*K to about 0.2 W/m*K. In addition, the thermal barriers 512 ideally will not melt from explosive burst fire from cell thermal runaway in order to provide thermal insulation for and protect surrounding cells 504. In some embodiments, the thermal barriers 512 can have a failure temperature above about 800° C. In various embodiments, the thermal barriers 512 are soft and/or porous thermal barriers to facilitate air flow, have a mechanical tensile strength below about 150 kPa, and are made from materials such as ceramic wool, fabric, gel, and foams (which may be formed using silicone, calcium oxide, ceramic powder, glass wool, etc.) that provide high levels of thermal resistance to prevent thermal damage to cells 504 without melting from fire caused by cell thermal runaway.

Strong and rigid thermal barriers, such as high mechanical strength ceramic or glass wool or fabric, ceramic plate barriers, rock wool barriers, etc., can block explosive burst fire from being emitted quickly through the apertures 526, holding the explosive burst fire within the cover 514 and potentially damaging cells 504 and allowing fire propagation. The thermal barrier 512 can be of varying thickness, where its thickness may vary depending on the amount of space between the battery cells 504 and the cover 514. In some cases, the thermal barrier 512 may have a nominal thickness of about 3 mm. The variations in the thickness of the thermal barrier 512 can vary depending on various factors, such as the material of the thermal barriers 512 and/or the energy absorption needed by the thermal barriers 512.

Although FIGS. 5A-5C illustrate one example of a battery module 500, those skilled in the art will recognize that various changes may be made to the example of FIGS. 5A-5C. For example, the overall structure of the battery module 500, the stiffening structure 525, the thermal barrier 512, and/or the cover 514 may differ without departing from the scope of this disclosure, such as by altering the dimensions of the battery module 500, the stiffening structure 525, the thermal barrier 512, and/or the cover 514, the number of battery cells, the arrangement of the battery cells, and so on. Additionally, the cover 514 may not include the portions of the side plates 516 that extend away from the battery cells 504 and that include the mounting holes or apertures, but rather and the side plates may include an adhesive strip to hold the cover in place.

Figure 6A:
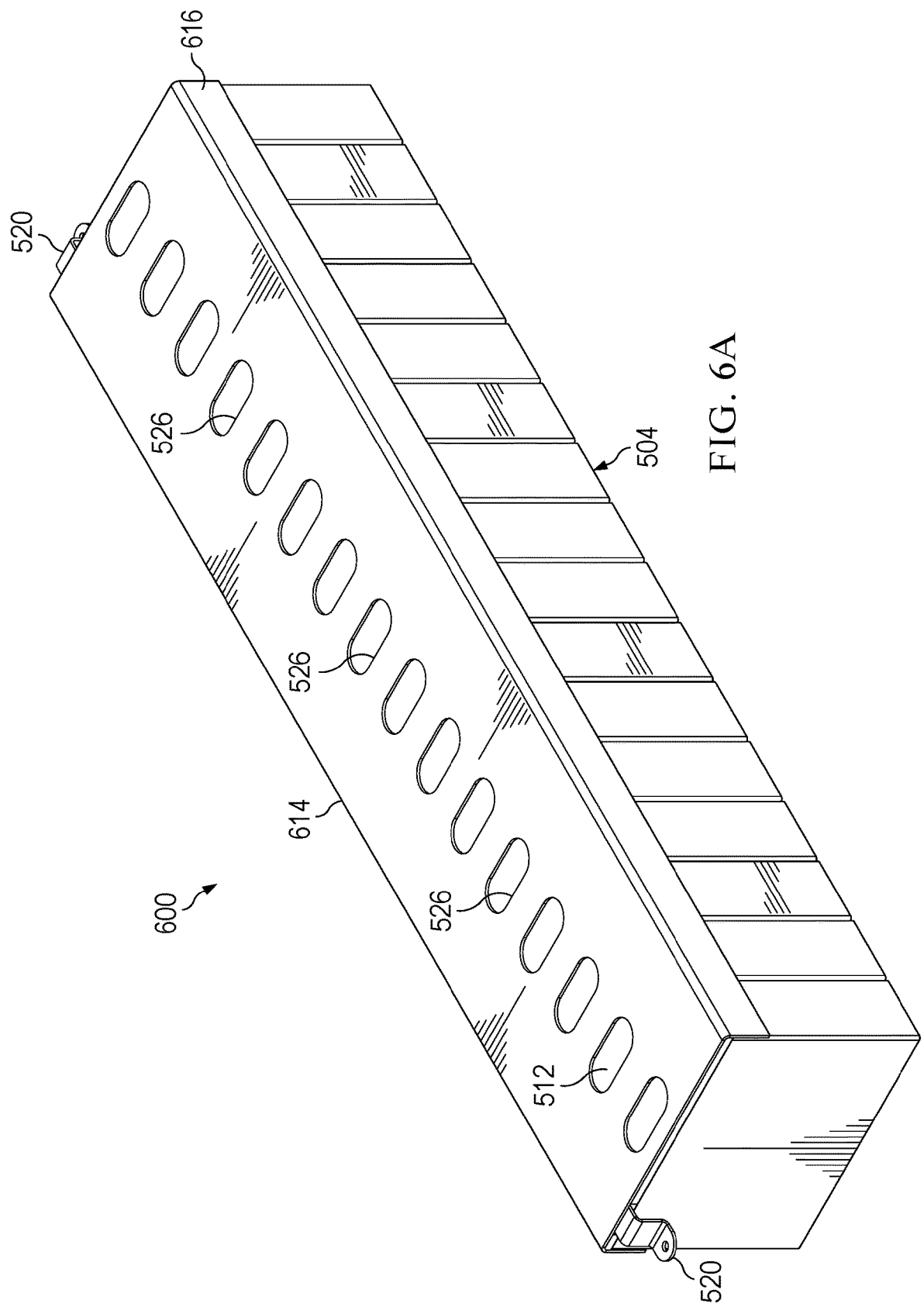
FIGS. 6A-6E illustrate an example battery module in which at least one of side plates of a cover include an adhesive strip or patch in accordance with embodiments of this disclosure.
Figure 6B:
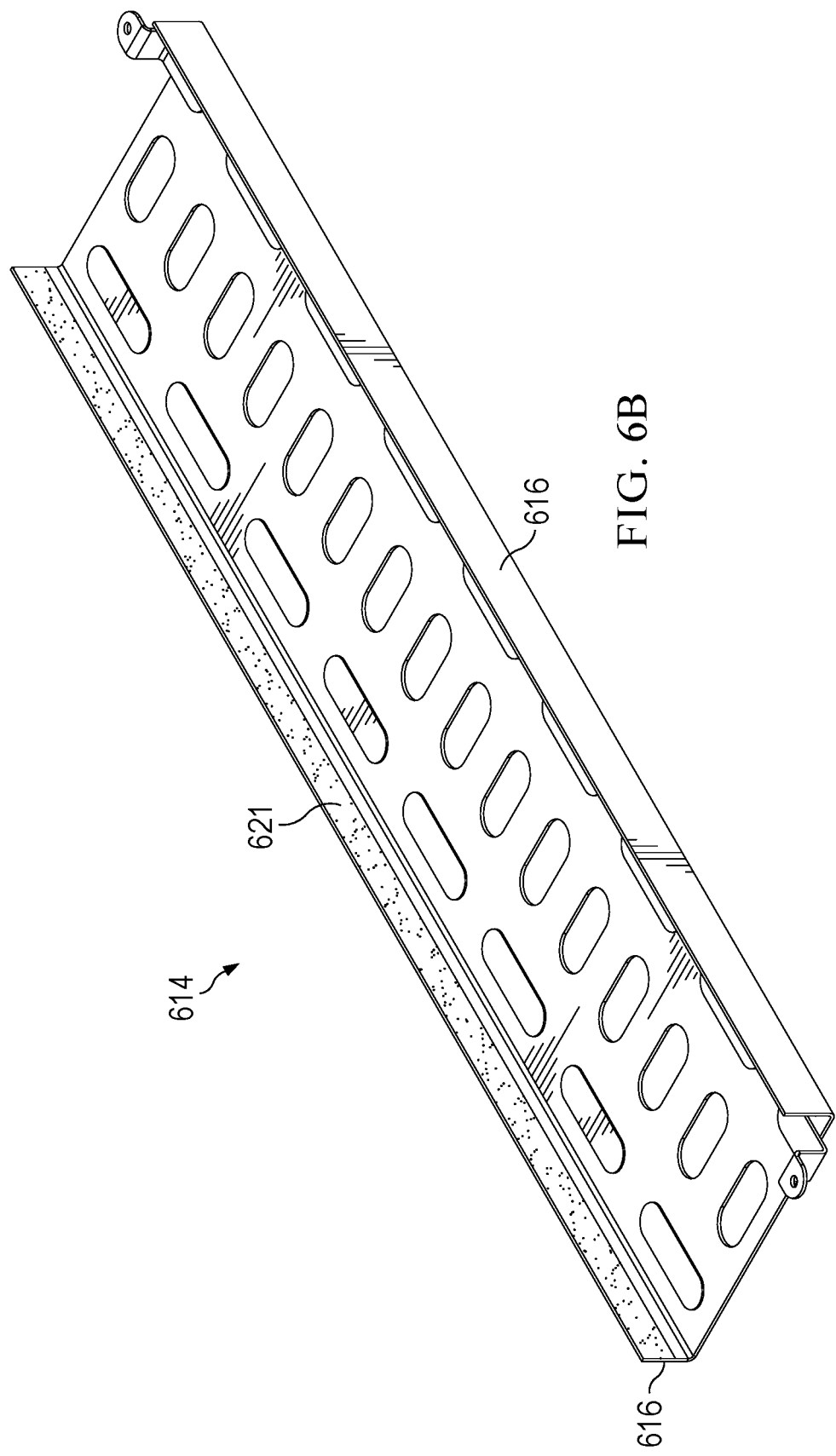
Figure 6C:
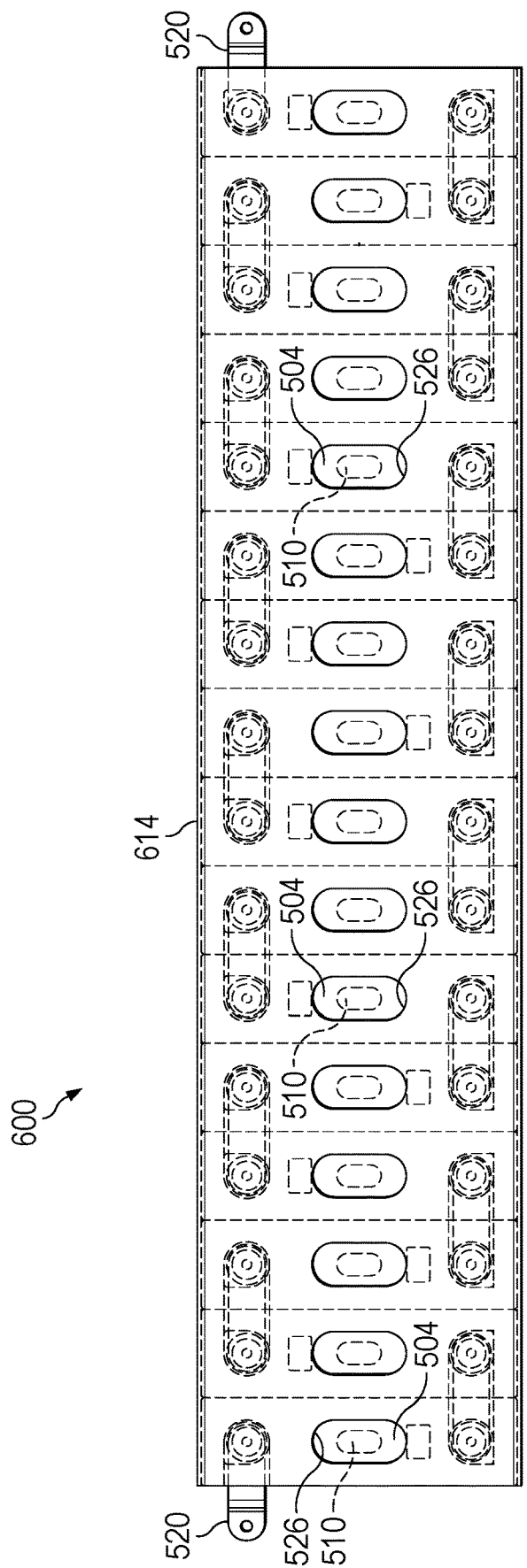
Figure 6D:
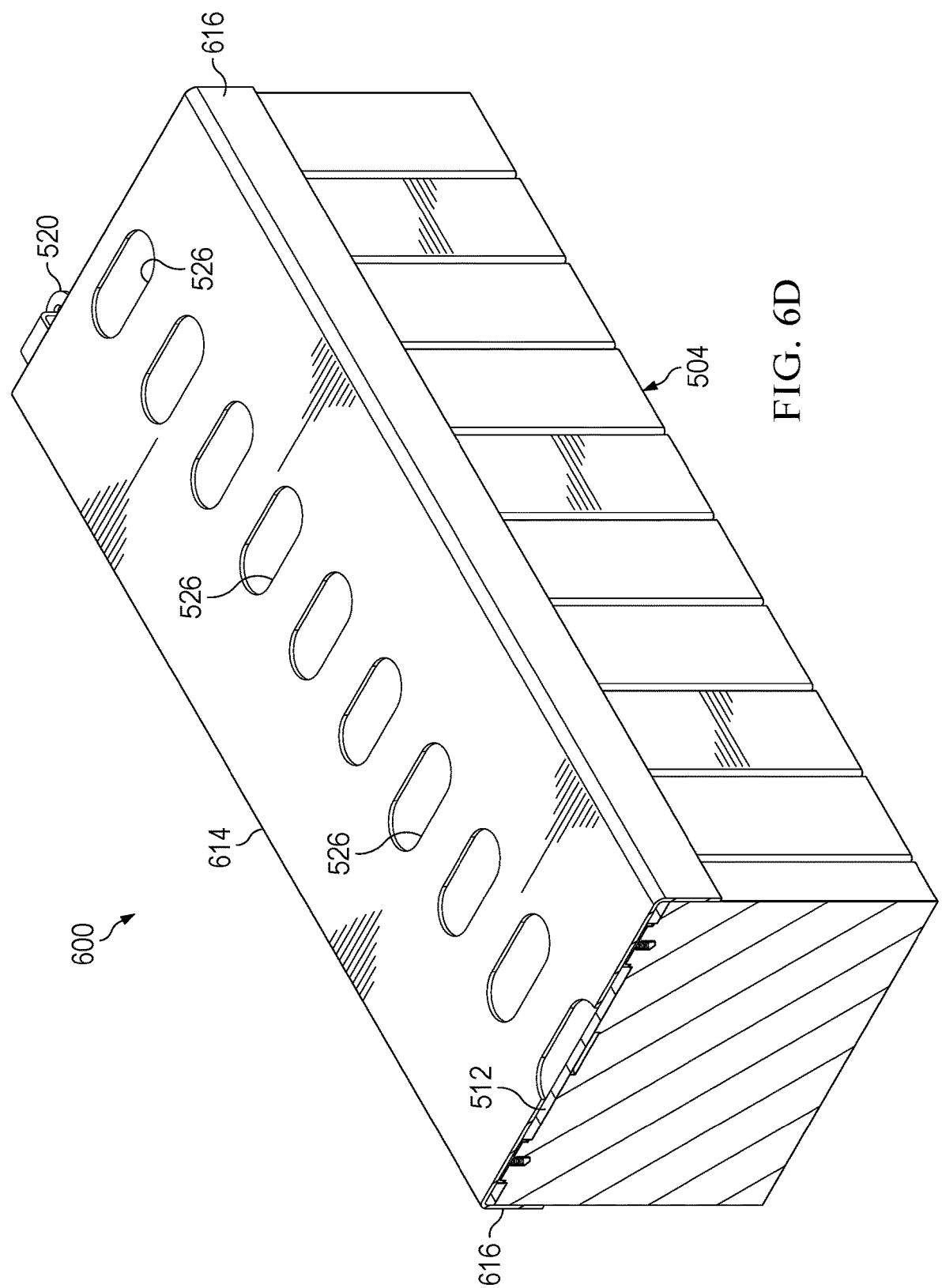
Figure 6E:
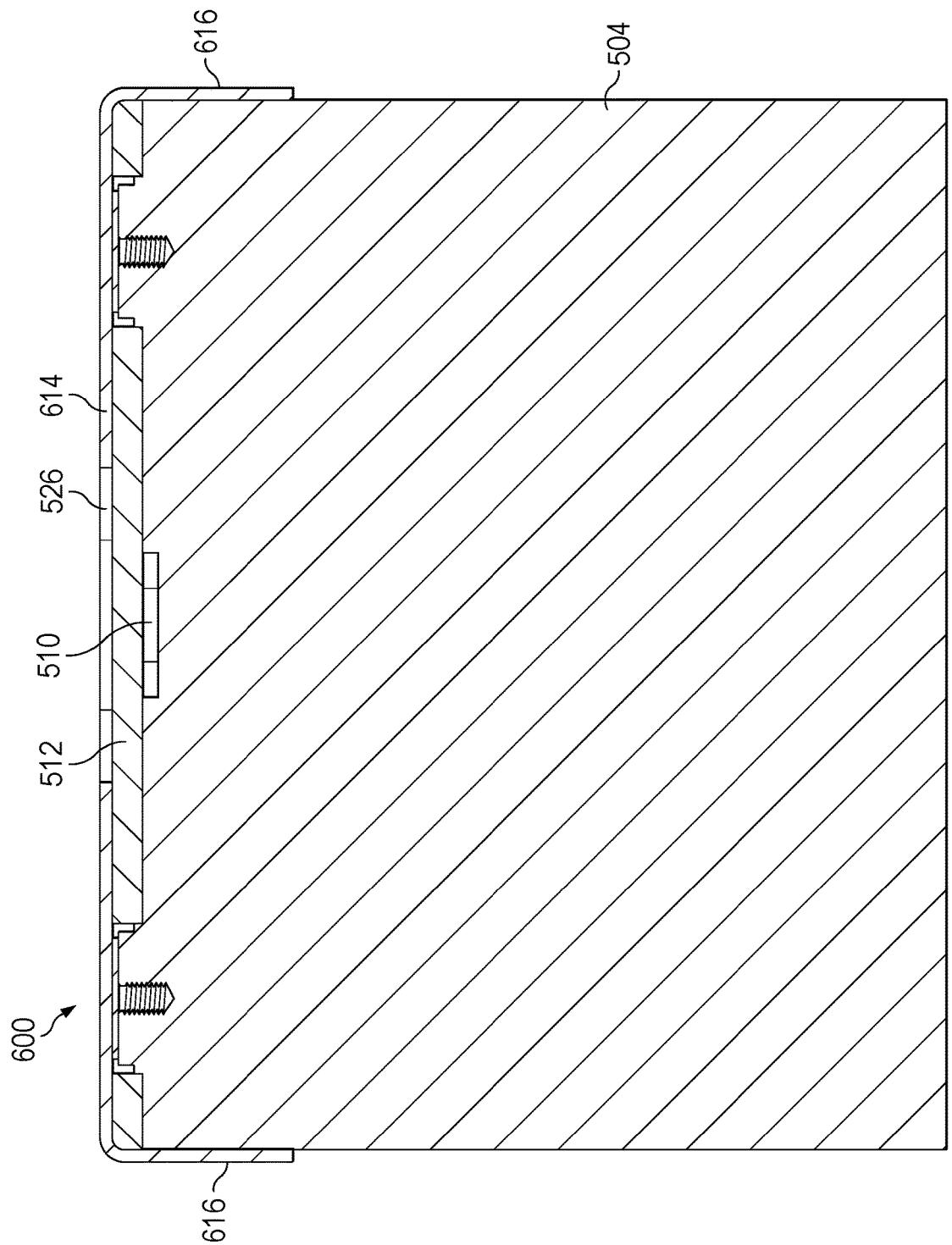

For example, FIGS. 6A-6E illustrate an example battery module 600 in which at least one of side plates 616 of a cover 614 include an adhesive strip or patch 621 in accordance with embodiments of this disclosure. FIG. 6A illustrates the battery module 600 fully assembled, FIG. 6B illustrates a bottom view of the cover 614 of the battery module 600, FIG. 6C illustrates a top view of the battery module 600 showing the cover 614 and cell vents 510 of the battery cells 504, FIG. 6D illustrates a perspective cross-sectional view of the battery module 600 showing an internal portion of the battery module 600, and FIG. 6E illustrates a front cross-sectional view of the battery module 600 showing an internal portion of the battery module 600.

As shown in FIG. 6B the adhesive strip 621 extends along at least one of the side plates 616. In some embodiments, one side plate 616 can include the adhesive strip 621. In some embodiments, both side plates 616 include an adhesive strip 621. The adhesive strip 621 couples and secures the side plate 616 to the battery cells 504 to prevent the cover 614 from moving or sliding. Additionally, although FIGS. 6A-6E do not illustrate the inclusion of a stiffening structure, such as the stiffening structure 525, it will be understood that such a stiffening structure can be included between the cover 614 and the thermal barrier 612 illustrated in FIGS. 6A-6E.

Although FIGS. 6A-6E illustrate one example of a battery module 600, those skilled in the art will recognize that various changes may be made to the example of FIGS. 6A-6E. For example, the overall structure of the battery module 600, the thermal barrier 612, and/or the cover 614 may differ without departing from the scope of this disclosure, such as by altering the dimensions of the battery module 500, the thermal barrier 512, and/or the cover 514, the number of battery cells, the arrangement of the battery cells, and so on.

Figure 7:
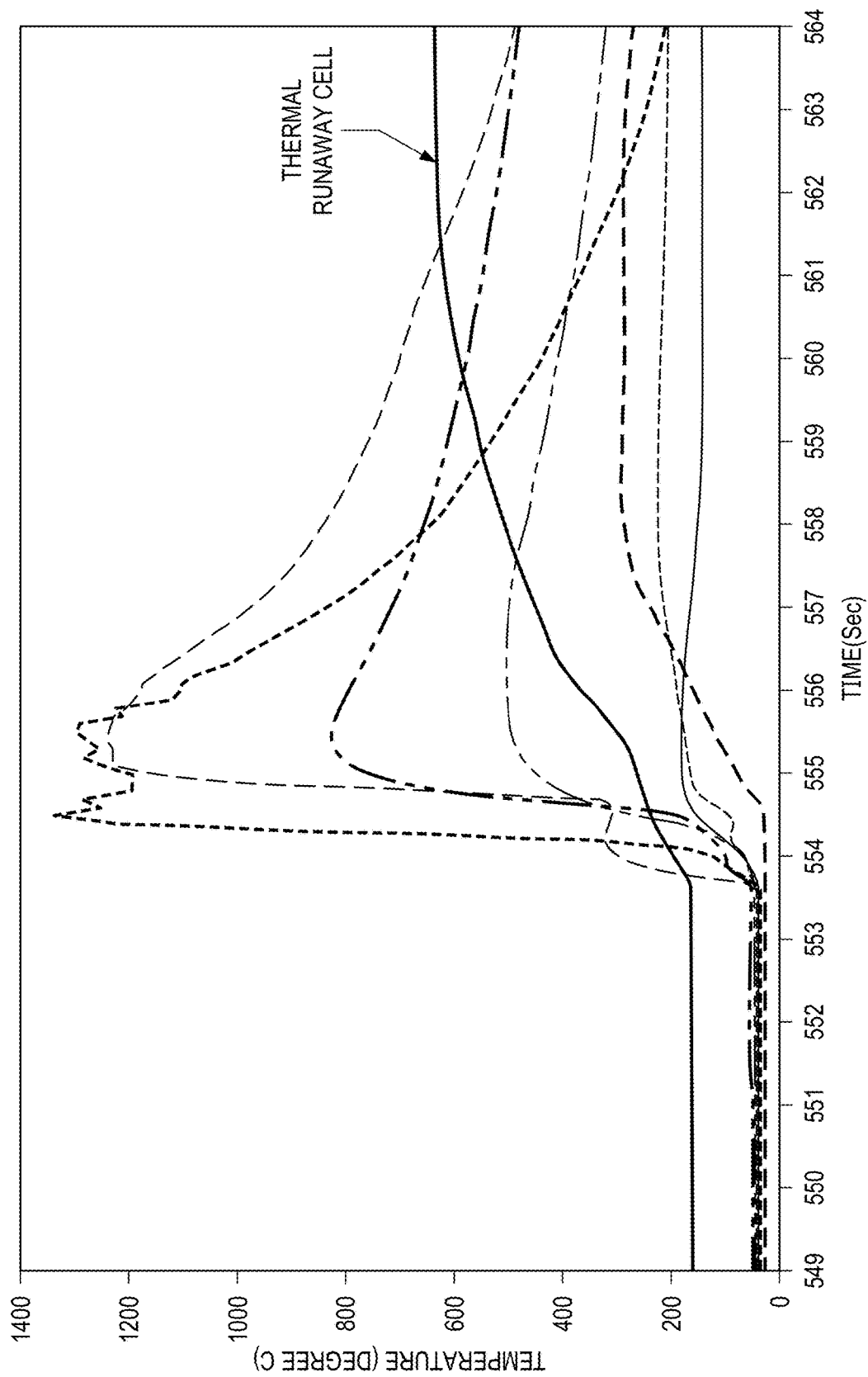
FIG. 7 illustrates an example chart showing temperatures of a battery cell experiencing thermal runaway and temperatures of surrounding cells, where a battery module includes a rigid thermal barrier and/or where the battery module does not have a cover with apertures aligned with cell vents.
Figure 8:
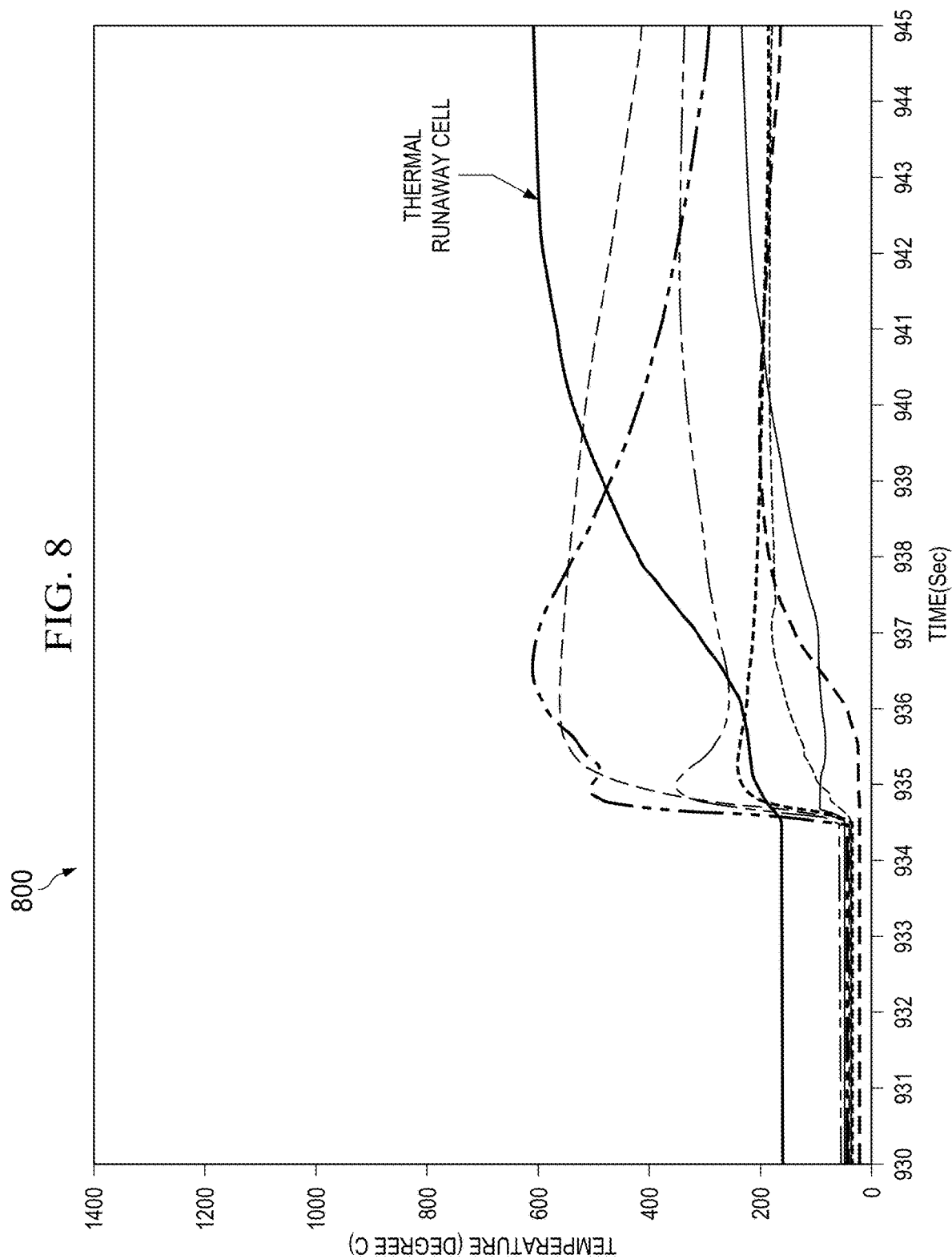
FIG. 8 illustrates an example chart showing temperatures of a battery cell experiencing thermal runaway, and temperatures of surrounding cells, where a battery module includes a soft thermal barrier and includes a cover with apertures aligned with cell vents in accordance with embodiments of this disclosure.

FIG. 7 illustrates an example chart 700 showing temperatures of a battery cell experiencing thermal runaway and temperatures of surrounding cells, where a battery module includes a rigid thermal barrier and/or where the battery module does not have a cover with apertures aligned with cell vents. FIG. 8 illustrates an example chart 800 showing temperatures of a battery cell experiencing thermal runaway, and temperatures of surrounding cells, where a battery module includes a soft thermal barrier and includes a cover with apertures aligned with cell vents in accordance with embodiments of this disclosure.

Due to explosive burst fire, surrounding battery cells' surface temperatures can increase to over approximately 1000° C. in a short time. As shown in FIG. 7, when a rigid thermal barrier is used and/or a battery module does not have a cover with apertures aligned with cell vents, a battery cell experiencing thermal runaway can cause temperatures of surrounding battery cells to rise close to or above 1000° C., even though its temperature has only reached 200° C. This can occur in as little as about 554 seconds in this example. This can cause fire propagation and/or damage to the surrounding battery cells.

As shown in FIG. 8, in accordance with embodiments of this disclosure, a soft thermal barrier and a protective cover with apertures aligned with cell vents are used. As a result, a battery cell experiencing thermal runaway takes longer to see temperatures rise above 200° C., such as over 900 seconds. Moreover, surrounding battery cells experience much lower temperatures, such as temperatures reaching only around 600° C. in this example. This is because, as described in the various embodiments of this disclosure, battery modules including soft thermal barriers and holes or apertures in a protective cover quickly guide and direct explosive burst fire emissions through the thermal barrier and through the of the protective cover apertures, which reduces or minimizes the amount of heat energy spread to surrounding battery cells.

Although FIGS. 7 and 8 illustrate examples of charts showing temperatures of battery cells experiencing thermal runaway and temperatures of surrounding cells in different scenarios, those skilled in the art will recognize that various changes may be made to the examples of FIGS. 7 and 8. For instance, the specific times, temperatures, and curves shown in FIGS. 7 and 8 are for illustration and explanation only and do not limit the scope of this disclosure.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A battery system comprising:
   a plurality of battery cells each having a vent configured to release emissions;
   a cover including a plurality of guide apertures;
   a thermal barrier between the cover and the plurality of battery cells adjacent the plurality of guide apertures; and
   a stiffening structure between the cover and the thermal barrier, and having a plurality of cutouts each shaped to correspond to at least one of the plurality of vents;
   wherein each one of the plurality of guide apertures is configured to guide emissions through the cover, and the thermal barrier is configured to absorb heat energy generated by the emissions.

2. The battery system of claim 1, wherein each of the plurality of guide apertures of the cover is aligned with the vent of one of the plurality of battery cells to guide emissions released by the vent through the cover.

3. The battery system of claim 1, further comprising a housing, wherein the plurality of battery cells is arranged within the housing and the cover is coupled to the housing.

4. The battery system of claim 3, wherein:
   the cover comprises side plates each coupled to the housing;
   the side plates each comprise a portion of the plurality of guide apertures; and
   the thermal barrier comprises two thermal barriers each disposed adjacent to one of the side plates.

5. The battery system of claim 1, wherein the plurality of battery cells comprises a plurality of cylindrical battery cells.

6. The battery system of claim 1, wherein the plurality of battery cells comprises a plurality of prismatic battery cells.

7. The battery system of claim 1, wherein the stiffening structure includes indentions to press the thermal barrier against the plurality of battery cells.

8. An electric vehicle comprising:
   at least one electric motor; and
   a power supply configured to provide electrical energy to the at least one electric motor, the power supply including a battery module comprising
      a plurality of battery cells each having a vent configured to release emissions,
      a cover including a plurality of guide apertures, a thermal barrier between the cover and the plurality of battery cells adjacent the plurality of guide apertures, and
a stiffening structure between the cover and the thermal barrier, and having a plurality of cutouts each shaped to correspond to at least one of the plurality of vents,
wherein each one of the plurality of guide apertures is configured to guide emissions through the cover, and the thermal barrier is configured to absorb heat energy generated by the emissions.

9. The electric vehicle of claim 8, wherein each of the plurality of guide apertures of the cover is aligned with the vent of one of the plurality of battery cells to guide emissions released by the vent through the cover.

10. The electric vehicle of claim 8, wherein:
the battery module further comprises a housing; and
the plurality of battery cells is arranged within the housing and the cover is coupled to the housing.

11. The electric vehicle of claim 10, wherein:
the cover comprises side plates each coupled to the housing;
the side plates each comprise a portion of the plurality of guide apertures; and
the thermal barrier comprises two thermal barriers each disposed adjacent to one of the side plates.

12. The electric vehicle of claim 8, wherein the plurality of battery cells comprises a plurality of cylindrical battery cells.

13. The electric vehicle of claim 8, wherein the plurality of battery cells comprises a plurality of prismatic battery cells.

14. The electric vehicle of claim 8, wherein the stiffening structure includes indentions to press the thermal barrier against the plurality of battery cells.

15. A battery system comprising:
a plurality of battery cells;
a cover including a plurality of guide apertures;
a thermal barrier between the plurality of battery cells and cover adjacent the plurality of guide apertures; and
a stiffening structure between the cover and the thermal barrier, and having a plurality of indentions for pressing the thermal barrier against the plurality of battery cells,
wherein each one of the plurality of guide apertures is configured to guide emissions through the cover, and the thermal barrier is configured to absorb heat energy generated by the emissions.

16. The battery system of claim 15, further comprising a housing, wherein the plurality of battery cells is arranged within the housing and the cover is coupled to the housing.

17. The battery system of claim 16, wherein:
the cover comprises side plates each coupled to the housing;
the side plates each comprise a portion of the plurality of guide apertures; and
the thermal barrier comprises two thermal barriers each disposed adjacent to one of the side plates.

18. The battery system of claim 15, wherein the plurality of battery cells comprises a plurality of cylindrical battery cells.

19. The battery system of claim 15, wherein the plurality of battery cells comprises a plurality of prismatic battery cells.

20. An electric vehicle comprising:
a plurality of battery cells;
at least one electric motor; and
a power supply configured to provide electrical energy to the at least one electric motor, the power supply including a battery module comprising
a cover including a plurality of guide apertures,
a thermal barrier between the plurality of battery cells and cover, and adjacent the plurality of guide apertures of the cover, and
a stiffening structure between the cover and the thermal barrier and including indentions to press the thermal barrier against the plurality of battery cells,
wherein each one of the plurality of guide apertures is configured to guide emissions through the cover, and the thermal barrier is configured to absorb heat energy generated by the emissions.

21. The electric vehicle of claim 20, wherein:
the battery module further comprises a housing; and
the plurality of battery cells is arranged within the housing and the cover is coupled to the housing.

22. The electric vehicle of claim 21, wherein:
the cover comprises side plates each coupled to the housing;
the side plates each comprise a portion of the plurality of guide apertures; and
the thermal barrier comprises two thermal barriers each disposed adjacent to one of the side plates.

23. The electric vehicle of claim 20, wherein the plurality of battery cells comprises a plurality of cylindrical battery cells.

24. The electric vehicle of claim 20, wherein the plurality of battery cells comprises a plurality of prismatic battery cells.

* * * * *